(12) United States Patent
Durrani

(10) Patent No.: US 11,370,325 B2
(45) Date of Patent: Jun. 28, 2022

(54) THERMAL SYSTEM LAYOUT DESIGNED FOR HIGH COOLING CAPACITY AT IDLE CONDITION

(71) Applicant: Hanon Systems, Daejeon (KR)

(72) Inventor: Navid Durrani, Kerpen (DE)

(73) Assignee: HANON SYSTEMS, Daejeon (KR)

( * ) Notice: Subject to any disclaimer, the term of this patent is extended or adjusted under 35 U.S.C. 154(b) by 428 days.

(21) Appl. No.: 16/726,344

(22) Filed: Dec. 24, 2019

(65) Prior Publication Data
US 2020/0220236 A1 Jul. 9, 2020

(30) Foreign Application Priority Data
Jan. 4, 2019 (DE) .......................... 102019100096.3

(51) Int. Cl.
*B60K 1/00* (2006.01)
*B60L 58/26* (2019.01)
*B60L 58/27* (2019.01)
*B60H 1/32* (2006.01)
*B60H 1/00* (2006.01)
*H01M 10/613* (2014.01)

(52) U.S. Cl.
CPC .......... *B60L 58/26* (2019.02); *B60H 1/00899* (2013.01); *B60H 1/32284* (2019.05); *B60L 58/27* (2019.02); *B60H 1/00278* (2013.01); *B60H 2001/00307* (2013.01); *B60H 2001/00928* (2013.01); *B60H 2001/00942* (2013.01); *B60L 2240/545* (2013.01); *H01M 10/613* (2015.04)

(58) Field of Classification Search
CPC .... B60L 58/26; B60L 58/27; B60L 2240/545; B60H 1/32284; B60H 1/00899; B60H 2001/00307; B60H 2001/00928; B60H 2001/00942; H01M 10/613
USPC ....................................................... 180/65.1
See application file for complete search history.

(56) References Cited

U.S. PATENT DOCUMENTS

| 2009/0317697 A1 | 12/2009 | Dogariu et al. |
| 2017/0096073 A1 | 4/2017 | Mardall et al. |
| 2021/0278113 A1* | 9/2021 | Ryu .................... B60H 1/00899 |

FOREIGN PATENT DOCUMENTS

| JP | 2010272285 A | 12/2010 |
| JP | 2012232730 A | 11/2012 |
| WO | 2014000884 A1 | 1/2014 |

* cited by examiner

*Primary Examiner* — Davis D Hwu
(74) *Attorney, Agent, or Firm* — Shumaker, Loop & Kendrick, LLP; James D. Miller

(57) ABSTRACT

An air conditioning and battery cooling arrangement is provided having an A/C coolant circuit and an electric drive train coolant circuit as well as a refrigeration circuit, wherein the A/C coolant circuit and the electric drive train coolant circuit are coupled to each other via a 4/2-way coolant valve in such a manner that the A/C coolant circuit and the electric drive train coolant circuit are configured to be operated separately or for serial through-flow.

21 Claims, 17 Drawing Sheets

THERMAL SYSTEM LAYOUT DESIGNED FOR HIGH COOLING CAPACITY AT IDLE CONDITION

CROSS-REFERENCE TO RELATED PATENT APPLICATIONS

The present disclosure claims the benefit of German Patent Application No. DE 102019100096.3 filed Jan. 4, 2019, the contents of which are hereby incorporated herein by reference in their entirety.

FIELD

The invention relates to an air conditioning and battery cooling arrangement for battery electric vehicles and methods for operating an air conditioning the vehicle and cooling the batteries.

Particularly, the invention relates to the concept of a thermal system for electric vehicles, vehicles with a hybrid drive, or fuel cell vehicles which are driven using so-called high-voltage batteries or accumulators. The highly electrified vehicles mentioned above are often equipped with an option for fast charging of the electric energy storage devices. This entails increased requirements with respect to cooling the respective energy storage devices during fast charging. High charging currents lead to high electric losses, for example, and consequently to high heating of the energy storage device.

BACKGROUND

During fast charging of the batteries, thermal systems must provide a particularly high cooling capacity, which is a challenge for conventional battery cooling systems.

The charging time of the high-voltage battery is a significant disadvantage in the eyes of the drivers and users of battery electric vehicles. For example, the charging time of a high-voltage battery from a typical household outlet is eight to twelve hours. The range of battery electric vehicles, on the other hand, is typically between 150 and 300 kilometers, which is why users have to recharge their vehicles frequently.

Significant reduction of the charging time of high-voltage batteries therefore is an important prerequisite for, and main driver of, increased acceptance of electric vehicles. Therefore, engineers are working on ultra-fast charging technologies aimed at reducing the battery charging time to about 20 minutes. The charging infrastructure needed for this purpose will be further extended along major roads in Europe in the coming years. Charging outputs of up to 350 kilowatts are provided by respective technologies, e.g. the so-called "ultra fast high powered charging network," such that recharging the batteries is comparable to refueling fuel-consuming vehicles at conventional gas stations. Disadvantages of fast charging the batteries include that lithium ion batteries, while providing comparatively high power density, are also susceptible to overcharging, deep discharge, and high charging currents which can result in fast overheating of the high-voltage battery, particularly at high ambient temperatures. To prevent damage to the high-voltage battery, the charging electronics monitor the condition of the batteries including voltage and temperature and adjust the charging current accordingly.

To allow high charging rates during the fast charging process, active cooling of the high-voltage battery is required to keep it within a specific temperature range of 10° C. to 35° C. High-voltage battery coolers are known from prior art which are either directly refrigerant cooled or indirectly coolant cooled and connected to the refrigerating circuit of the vehicle to keep the batteries at the desired temperature level. The waste heat is absorbed by the coolant or refrigerant and released into the environment or may optionally even be used for heating the passenger compartment.

In battery cooling systems which are directly refrigerant cooled, the refrigeration circuit absorbs the waste heat from the high-voltage battery or the passenger compartment on the low pressure side through evaporation of the refrigerant in the evaporator. The evaporated refrigerant is compressed to a higher pressure level by the compressor. The compression process adds heat to the refrigerant. The refrigerant enters the condenser at the compressor outlet as a high-pressure gas at a high temperature. Inside the condenser, the evaporation or compression heat absorbed previously is either released into the ambient air, for an air-cooled condenser, or to a coolant, such as in a water-cooled condenser. The refrigerant leaves the condenser in liquid form but still under high pressure before it enters the expansion device. The refrigerant flowing through the expansion device is relieved from a high pressure to a low pressure level. The refrigerant temperature drops likewise in the process down to a level which is once again suitable for absorbing waste heat. The cold and liquid refrigerant then enters the evaporator and can again absorb heat by evaporation, which closes the refrigeration circuit.

Battery cells produce about 8 kilowatts to 12 kilowatts of waste heat in the fast charging process. At high ambient temperatures, the cooling capacity of the air conditioning system of the vehicle must be able to absorb the battery waste heat produced in addition to air conditioning the passenger compartment to lower the temperature of the cells below a critical value or keep it at that level, respectively.

In known systems, the capacity of the condenser, which is also called a radiator since it transmits air heat, is a weak point and it is a challenge to dimension it appropriately. When heat is released directly via the condenser or indirectly via the radiator, the entire evaporation heat from the passenger compartment and the battery as well as compression heat from the compressor is released into the ambient air.

During the fast charging process, the condenser or radiator, respectively, must thus be able to release about 20 kilowatts to 22 kilowatts of waste heat from the air conditioning system into the environment while the vehicle is connected to the outlet with the charging process running. A conventional condenser or a simple radiator is not capable of such an output when the vehicle is idling and stationary. Only at high air flow rates, caused by the relative wind while driving, can the condenser or radiator, respectively, provide the required output.

Therefor the heat release of a cooling circuit has a great influence on charging performance and thus on the charging time of a battery electric vehicle.

Various systems for battery cooling of battery electric vehicles are known from prior art.

For example, US 2009/0317697 A1 discloses a battery cooling system having a bypass, wherein battery cooling is implemented in combination with air conditioning the passenger compartment via various circuit configurations and a bypass.

It is a disadvantage of the known solutions that the conventional systems cannot provide sufficient cooling capacity, particularly during fast charging when the vehicle is stationary. Therefore, other approaches to solving the problem of lacking cooling capacity were pursued in prior art.

US 2017/0096073 A1, for example, discloses a charging station with a thermal management system of an electric vehicle during the charging phase. This system includes connecting the battery cooling circuit of the vehicle to an external cooling circuit of the charging station in which sufficient cooling capacity for cooling the batteries during the charging process is provided.

Alternatively, an internal separate reservoir is provided in the vehicle, which reservoir can store a certain portion of the waste heat during the charging process when the external system of the charging station is not available.

It is a disadvantage of systems having external cooling capacity that a great infrastructural effort is needed to provide extra cooling stations at electric charging stations.

Furthermore, coupling the cooling systems of the vehicle and the charging station requires an additional operating effort by the user. Additional coupling of the systems by establishing fluid connections in addition to electric connections may also require a greater technological effort than just the electrical connection for charging the batteries.

SUMMARY

It is therefore the problem of the invention to be able to cool the energy storage device in accordance with increased demand in the vehicle and using the on-board air conditioning system.

Particularly, a system is to be provided which allows the provision of a high cooling capacity during fast charging when the vehicle is stationary, but which is also capable of meeting the typical requirement profiles for vehicle air conditioning systems.

This problem is solved by the subject matter as disclosed herein.

First, there are several approaches to solving the problem of extending the cooling capacity. One such approach is to increase the output of the condenser or radiator, respectively, when the vehicle is stationary. The end face area of the condenser or radiator, respectively, may be increased to this end. Another aspect is to provide a heat storage device which can receive a specific amount of heat in the charging process. And finally, high-capacity fans can be used to increase the air quantity in the radiator during standstill to compensate for the lack of relative wind or to replace the relative wind, respectively.

According to the concept of the invention, the problem is solved in that the heat transfer capacity to the ambient air is increased by connecting and combining subsystems for specific operating conditions and parameter constellations, wherein each subsystem of the heat management system is modular and variable and can be connected or disconnected as needed.

The problem of the invention is particularly solved by an air conditioning and battery cooling arrangement having an A/C coolant circuit and an electric drive train coolant circuit as well as a refrigeration circuit, wherein the A/C coolant circuit and the electric drive train coolant circuit are coupled to each other via a 4/2-way coolant valve in such a manner that the A/C coolant circuit and the electric drive train coolant circuit are configured to be operated separately or for serial through-flow.

Furthermore, the A/C coolant circuit comprises at least an A/C coolant radiator for releasing heat into the ambient air, a coolant pump, and a condenser via which the A/C coolant circuit is thermally connected to the refrigeration circuit.

The electric drive train coolant circuit comprises at least a battery cooler, a coolant pump, a drive train coolant radiator for releasing heat into the ambient air, and a chiller via which the electric drive train coolant circuit is thermally connected to the refrigeration circuit.

The refrigeration circuit comprises at least a compressor, the condenser, an ambient heat exchanger for releasing heat into the ambient air or for absorbing heat from the ambient air, an expansion device, and the chiller.

The A/C coolant circuit includes the condenser and a coolant pump in its base strand. The base strand splits into two substrands, which can be flown through alternatively or cumulatively. One substrand includes the A/C coolant radiator and the 4/2-way coolant valve and the other sub-strand contains the heating heat exchanger of the vehicle air conditioning system. The substrands are reunited upstream of the condenser. The A/C coolant circuit is connected to the refrigeration circuit via the condenser.

The electric drive train coolant circuit has multiple interconnectable substrands. Two coolant pumps are provided, which allow coolant to flow independently through any substrands formed. One substrand is formed by the components of the electric drive train with a coolant pump. Another substrand is formed by another coolant pump, a coolant heating unit, and the battery cooler, wherein a bypass for the battery cooler is additionally provided. The substrand just mentioned is configured parallel to the first substrand. Another parallel substrand comprises the chiller. And finally, yet another parallel substrand is formed with the drive train coolant radiator and the 4/2-way coolant valve. This results in four substrands, which are connected in parallel and combined into the electric drive train coolant circuit.

Coolants are generally liquids for heat transfer which are used as heat transfer media or as cooling media, depending on the application. Water-glycol mixtures, for example, are particularly common in coolant circuits in motor vehicles.

The coolant circuit generally consists of the components already mentioned, i.e. a compressor, the coolant-cooled or water-cooled condenser, and the ambient heat exchanger with an upstream expansion device. The ambient heat exchanger can thus act as an aftercooler or subcooler for the condenser, or as an evaporator for heat absorption from the ambient air in the heat pump mode. Furthermore, the evaporator for cooling the passenger compartment and the chiller are part of the strands of the coolant circuit. The chiller is an evaporator on the coolant side and therefore has an upstream and associated expansion device. The chiller absorbs heat from the electric drive train coolant circuit.

The A/C coolant radiator is a liquid/air heat exchanger which is positioned in the A/C coolant circuit in a substrand with the 4/2-way coolant valve.

The drive train coolant radiator is likewise a liquid/air heat exchanger and likewise arranged in a substrand with the 4/2-way coolant valve in the electric drive train coolant circuit.

The heat exchangers, i.e. the A/C coolant radiator and the drive train coolant radiator, can each be operated separately in their respective substrands of the A/C coolant circuit and electric drive train coolant circuit and can in addition be connected in series via the 4/2-way coolant valve and can thus be serially flown through one after the other.

The ambient heat exchanger is a coolant/air heat exchanger which is arranged downstream of the condenser in the coolant circuit.

The three heat exchangers mentioned above are air heat exchangers in which heat is released into the environment in refrigeration system operation or heat is absorbed from the environment in specific operating conditions in heat pump operation.

The chiller is a refrigerant/coolant heat exchanger which is arranged in a substrand of the electric drive train coolant circuit.

The technological concept for increasing the cooling capacity of the air conditioning and battery cooling arrangement is based on three air heat exchangers being available in the refrigeration circuit for heat dissipation in times of particularly high cooling capacity demand and the respective condensation heat production.

In addition, the batteries can be cooled actively or passively via the refrigeration circuit or the coolant circuit, wherein active battery cooling means cooling the batteries using cooling capacity of the refrigeration circuit and passive battery cooling means using the cooling capacity of the coolant circuit. The coolant circuit then releases waste heat into the ambient air in an air heat exchanger. Another aspect of the concept of the invention is that waste heat is temporarily stored in the sections of the coolant circuit which are separated from battery cooling. The waste heat which is temporarily absorbed and stored is then released into the environment in other operating conditions.

It is preferred that the A/C coolant circuit comprises a heating heat exchanger for heating the passenger compartment, which can either be connected in parallel or alternatively to the A/C coolant radiator in the A/C coolant circuit.

The air conditioning and battery cooling arrangement is advantageously complemented in that the electric drive train coolant circuit has a heating device in a substrand, which device is connected in series upstream of the battery cooler, and that furthermore a bypass to the battery cooler is formed.

In the electric drive train coolant circuit, a coolant pump and/or an inverter and/or an electric motor heat exchanger is/are arranged in a substrand and can be flown through parallel to the battery cooler.

An expansion device is preferably arranged in the refrigeration circuit downstream of the condenser and upstream of the ambient heat exchanger, whereby the ambient heat exchanger is configured as an evaporator for absorbing heat from the ambient air and can be operated in heat pump mode.

In the refrigeration circuit, a front evaporator with an associated and upstream expansion device and/or a rear evaporator with an associated and upstream expansion device are connected in parallel, depending on the respective embodiment. Furthermore, a low-pressure accumulator may optionally be arranged upstream of the compressor in the refrigeration circuit.

In addition, an internal heat exchanger is arranged on the high pressure side in the refrigeration circuit, either downstream of the ambient heat exchanger or alternatively downstream of the condenser.

The problem of the invention is further solved by a method for operating an air conditioning and battery cooling arrangement in that, if there is a high cooling capacity demand for fast battery charging, the chiller in the refrigeration circuit is operated and the condensation heat from the refrigeration circuit is released into the ambient air via the ambient heat exchanger and is transferred via the condenser to a coolant circuit and released into the ambient air via the serially connected A/C coolant radiator and the drive train coolant radiator. The A/C coolant circuit and the electric drive train coolant circuit are connected in series via the 4/2-way coolant valve, wherein the battery cooler and the chiller of the refrigeration circuit form a separate coolant circuit.

Advantageously, the front evaporator and/or the rear evaporator are operated in addition to the chiller in the refrigeration circuit for producing cold for air conditioning the passenger compartment.

If the cooling capacity demand for air conditioning the passenger compartment and for battery cooling is moderate, preferably the chiller and the front evaporator and/or the rear evaporator in the refrigeration circuit are operated. The condensation heat from the refrigeration circuit is released into the ambient air via the ambient heat exchanger as well as transferred via the condenser to the A/C coolant circuit and released into the ambient air via the A/C coolant radiator. The drive train coolant radiator releases waste heat from the electric drive train coolant circuit into the ambient air, wherein the battery cooler and the chiller of the refrigeration circuit form a separate coolant circuit.

If the cooling capacity demand for air conditioning the passenger compartment is moderate, the front evaporator and/or the rear evaporator in the refrigeration circuit are advantageously operated and the condensation heat from the refrigeration circuit is released into the ambient air via the ambient heat exchanger as well as transferred via the condenser to the A/C coolant circuit and released into the ambient air via the A/C coolant radiator, wherein the drive train coolant radiator releases the waste heat from the electric drive train coolant circuit into the ambient air.

If the cooling capacity demand for active battery cooling is moderate, the chiller in the refrigeration circuit is advantageously operated and the condensation heat from the refrigeration circuit is released into the ambient air via the ambient heat exchanger as well as transferred via the condenser to the A/C coolant circuit and released into the ambient air via the A/C coolant radiator. The drive train coolant radiator releases waste heat from the electric drive train coolant circuit into the ambient air, wherein the battery cooler and the chiller of the refrigeration circuit form a separate coolant circuit.

In passive battery cooling operation, the drive train coolant radiator advantageously releases waste heat from the electric drive train coolant circuit into the ambient air, wherein the battery cooler is connected in parallel to the electric motor heat exchanger and/or to the converter and/or to the inverter.

In reheat operation at mild ambient temperatures, the front evaporator and/or the rear evaporator in the refrigeration circuit are advantageously operated and the condensation heat from the refrigeration circuit is released into the ambient air via the ambient heat exchanger as well as transferred via the condenser to the A/C coolant circuit and released via the heating heat exchanger for reheating the air for the passenger compartment. The drive train coolant radiator advantageously releases waste heat from the electric drive train coolant circuit into the ambient air, wherein the battery cooler is connected in parallel to the electric motor heat exchanger and/or to the converter and/or to the inverter.

The term reheat in vehicle air conditioning means that the air to be supplied to the passenger compartment is initially cooled and dehumidified and then reheated to the desired temperature. Two reheat constellations are distinguished. First, a state of the air conditioning and battery cooling arrangement in which, particularly at moderate ambient temperatures, the cooling capacity demanded of the system is higher than the heating capacity required for reheating the air to be released into the passenger compartment. This is called reheat in refrigeration system operation.

Furthermore, a constellation occurs in which the heating capacity required for reheating the air is higher than the cooling capacity required for dehumidifying the air. This is called reheat in heat pump operation.

In reheat operation at cold ambient temperatures, the chiller, the front evaporator and/or the rear evaporator in the refrigeration circuit are advantageously operated and the condensation heat is transferred via the condenser from the refrigeration circuit to the A/C coolant circuit and released via the heating heat exchanger for heating the air for the passenger compartment. The battery cooler is connected in parallel to the electric motor heat exchanger and/or to the converter and/or to the inverter, wherein the chiller of the refrigeration circuit forms a separate coolant circuit with the battery cooler and the electric drive train coolant circuit connected in parallel.

In heating operation at cold ambient temperatures, the ambient heat exchanger in the refrigeration circuit is connected as evaporator for absorbing heat from the ambient air, wherein the condensation heat from the refrigeration circuit is transferred via the condenser to the A/C coolant circuit and the heating heat exchanger for heating the air for the passenger compartment.

In heating operation at cold ambient temperatures, preferably the chiller in the refrigeration circuit is operated and the condensation heat from the refrigeration circuit is transferred via the condenser to the A/C coolant circuit and the heating heat exchanger for heating the air for the passenger compartment, wherein the chiller of the refrigeration circuit forms a separate coolant circuit with the with the electric motor heat exchanger and/or the converter and/or the inverter of the electric drive train coolant circuit.

Furthermore, the ambient heat exchanger is preferably operated as an evaporator in addition to the chiller.

In heating operation at very cold ambient temperatures, the chiller in the refrigeration circuit is operated and the condensation heat is transferred from the refrigeration circuit via the condenser to the A/C coolant circuit and to the heating heat exchanger for heating the air for the passenger compartment. The chiller of the refrigeration circuit forms a separate coolant circuit with the additional heating device of the electric drive train coolant circuit.

In heating operation at cold ambient temperatures, the ambient heat exchanger in the refrigeration circuit is advantageously connected as an evaporator for absorbing heat from the ambient air, wherein the condensation heat from the refrigeration circuit is transferred via the condenser to the A/C coolant circuit and the heating heat exchanger for heating the air for the passenger compartment. The battery cooler forms a separate coolant circuit with the additional heating device of the electric drive train coolant circuit for heating the battery cooler.

BRIEF DESCRIPTION OF THE DRAWINGS

Further details, features, and advantages of embodiments of the invention result from the subsequent description of exemplary embodiments with reference to the associated drawings. Wherein.

DETAILED DESCRIPTION OF THE EMBODIMENTS

Figure 1:
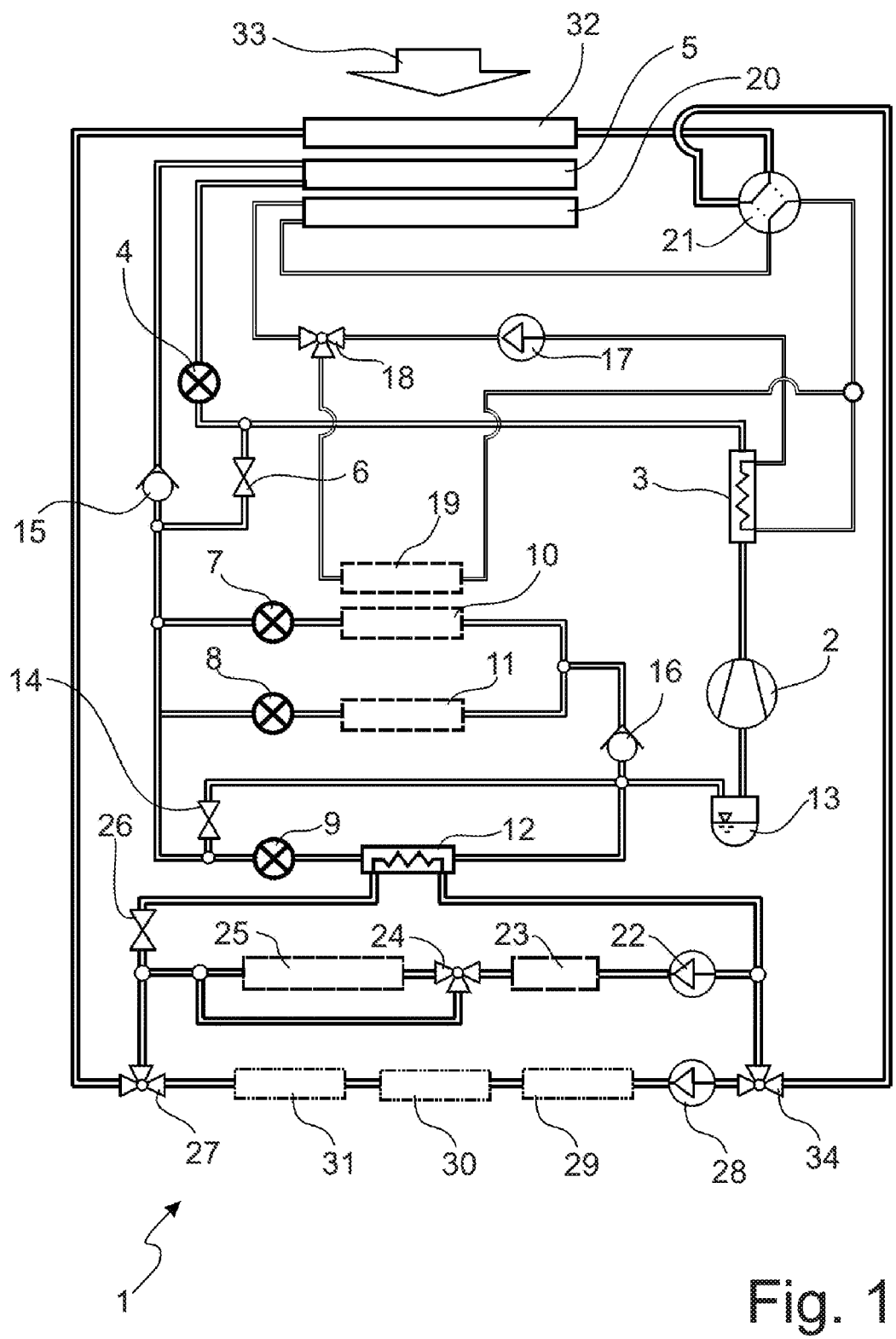
FIG. 1: shows a circuit diagram of the air conditioning and battery cooling arrangement.

FIG. 1 shows a circuit diagram of an air conditioning and battery cooling arrangement 1 with all major components and optional connection configurations. The overall thermal system of the combination of coolant and refrigeration circuits has heat pump functionality in addition to refrigeration system functionality. This means that the air conditioning and battery cooling arrangement can be provided for producing both cold and heat for the vehicle.

The system consists of two coolant circuits and one refrigeration circuit, wherein the coolant circuits can be coupled to each other. To this end, a 4/2-way coolant valve 21 is provided to combine the A/C coolant circuit and the electric drive train coolant circuit into a large serial circuit or to completely disconnect the two circuits. The serial coupling of substrands of the A/C coolant circuit and the electric drive train coolant circuit allows that the drive train coolant radiator 32 can be used in addition to the A/C coolant radiator 20 and the ambient heat exchanger 5 of the refrigeration circuit for releasing condensation heat into the ambient air 33.

Furthermore, the electric drive train components inverter 29, converter 30, electric motor heat exchanger 31, through which fluid flows successively in the fluid flow direction between the drive train coolant radiator 32 and the A/C coolant radiator 20, can be used as heat storage devices to store a specific amount of waste heat from the refrigeration system when the vehicle is stationary. This temporarily stored heat can later be released into the environment when the coolant circuits are completely disconnected in driving operation. In the heating mode, in heat pump operation, the temporarily stored heat or the waste heat from the electric drive train components, respectively, can be used as a heat source for evaporating the refrigerant, and this heat can be made accessible to the system for heating. In this way, the overall thermal system allows the air conditioning and battery cooling arrangement to provide high cooling and heating capacities in a very efficient manner.

The A/C coolant circuit is represented as a thin double line.

The refrigeration circuit is represented as a medium-weight double line. The electric drive train coolant circuit is represented as a thick double line.

The following description of FIGS. 2 to 13 explains the essential operating modes of the air conditioning and battery cooling arrangement 1 according to FIG. 1 in which the system can be operated for respective specific basic tasks. Combinations of the modes described are of course possible for specific constellations.

Fluid connections through which fluid flows in each of the modes are represented as double lines. Single lines mean that no fluid flows through these in the respective mode.

Figure 2:
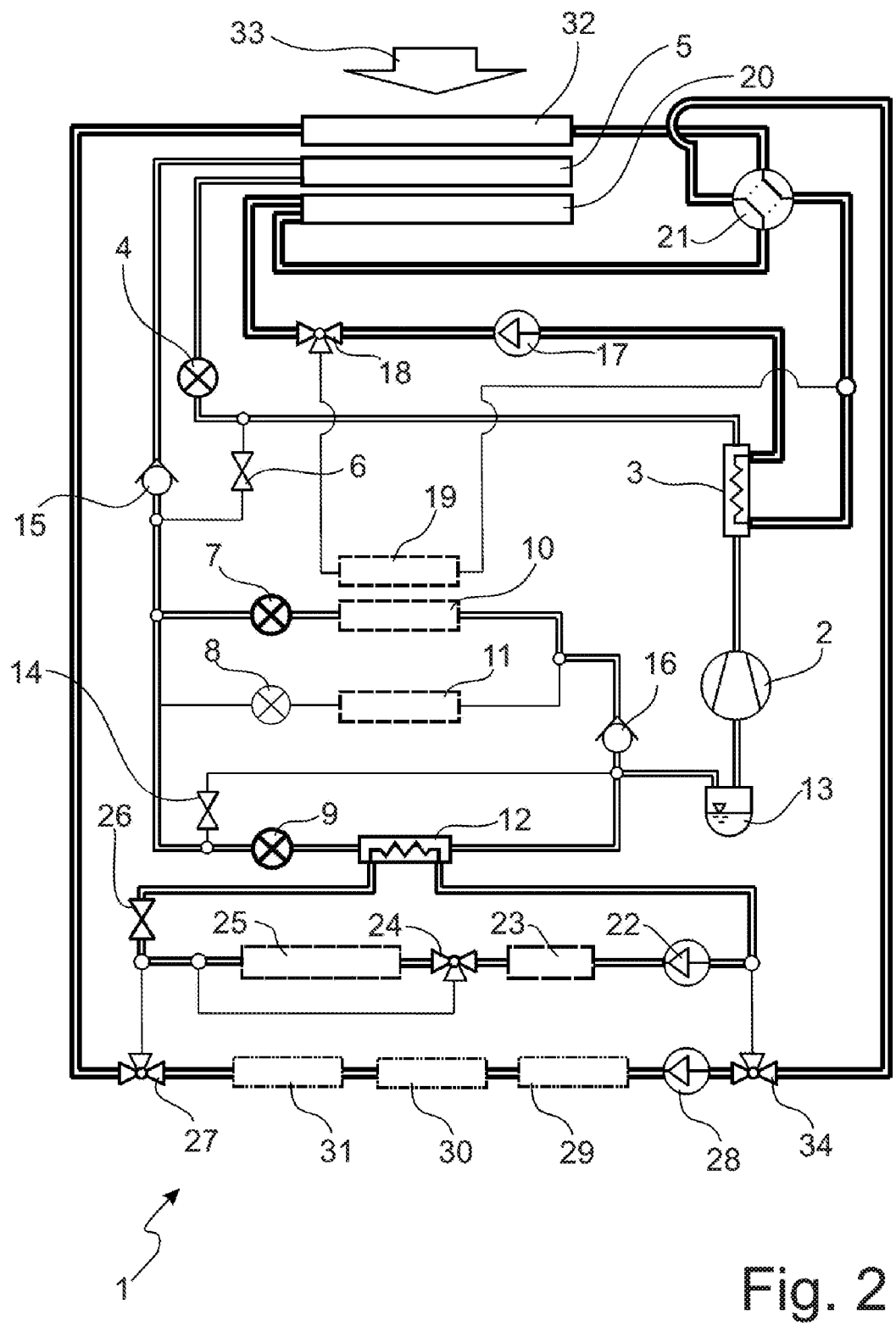
FIG. 2: shows a flow diagram of the cooling capacity demand during fast charging.

FIG. 2 shows the flow diagram of the air conditioning and battery cooling arrangement 1 shown in FIG. 1 when connected for high refrigerating capacity during fast charging of the batteries. In this operating mode, the 4/2-way coolant valve 21 is switched such that the A/C coolant circuit is connected to the electric drive train coolant circuit to form a serial coolant circuit by connecting sub strands of the two coolant circuits one after the other. In this manner, the condensation heat transferred via the condenser 3 to the A/C coolant circuit is
released to the ambient air 33 both via the drive train coolant radiator 32 of the electric drive train coolant circuit and by the A/C coolant radiator 20 of the A/C coolant circuit.

The expansion device 4 between the coolant-cooled condenser 3 and the ambient heat exchanger 5 is fully opened and the bypass of the ambient heat exchanger 5 is closed, such that the coolant condensed in the condenser 3 is further chilled in the ambient heat exchanger 5 and waste heat of the refrigeration circuit is released into the ambient air 33.

Furthermore, the electric drive train components inverter 29, converter 30, electric motor heat exchanger 31, through which fluid flows successively in the fluid flow direction between the drive train coolant radiator 32 and the A/C coolant radiator 20, are in this mode used as heat storage devices to store a specific amount of waste heat from the refrigeration circuit during the fast charging process. This temporarily stored heat can later be released into the environment when the coolant circuits are completely disconnected in driving operation.

The high-voltage battery is actively cooled by the chiller 12 in a separate, smaller coolant circuit made from substrands of the electric drive train coolant circuit at temperatures below the ambient temperature. The battery temperature has the highest priority in this mode. If the battery temperature allows, the air flowing into the passenger compartment can also be additionally and simultaneously cooled by the front evaporator 10 and/or rear evaporator 11. The operating mode shown in FIG. 2 shows the additional cooling of the vehicle air by the front evaporator 10 while the expansion device 7 is active and can be described as follows. In the refrigeration circuit, the compressor 2 compresses the refrigerant which is subsequently cooled and condensed in the condenser 3. When the expansion device 4 is fully opened, the refrigerant reaches the ambient heat exchanger 5, wherein the refrigerant is condensed in the condenser 3 and condensed and then optionally chilled in the ambient heat exchanger 5. The liquid refrigerant then flows via the non-return valve 15 in the passage direction to the expansion device 9 upstream of the chiller 12 and, according to the embodiment of the invention shown, at the same time to the expansion device 7 upstream of the front evaporator 10. In the embodiment shown in FIG. 2, the refrigerant now evaporates in the front evaporator 10 and in the chiller 12, and the refrigerant gas flows via the low-pressure accumulator 13, where any liquid refrigerant still present is optionally separated, to the compressor 2, which closes the circuit.

In the condenser 3, the refrigerant transfers the condensation heat to the A/C coolant circuit. The coolant is delivered by the coolant pump 17 via the 3-way valve 18 to the A/C coolant radiator 20 and flows from there via the 4/2-way coolant valve 21 and the 3-way valve 34 to the coolant pump 28. Now the coolant flows through the inverter 29, the converter 30, and the electric motor heat exchanger 31 and returns via the 3-way valve 27 to the drive train coolant radiator 32 and via the 4/2-way coolant valve 21 to the inlet of the condenser 3. The circuit from the two substrands is closed via the 4/2-way coolant valve.

The waste heat from the refrigeration circuit is released into the ambient air 33 via the ambient heat exchanger 5 and the drive train radiator 32 and A/C coolant radiator 20. In this operating mode, the cooling load is mainly focused on the battery cooler 25, which is a separate coolant circuit in the electric drive train coolant circuit connected from substrands of the electric drive train coolant circuit. The coolant pump 22 pumps the coolant through the battery cooler 25 via the opened stop valve 26 and the chiller 12 with the 3-way valve 34 closed back to the coolant pump. The battery cooling circuit is actively cooled via the chiller 12 of the coolant circuit and thus closed. The heating device 23 of the coolant circuit is of course inactive in this mode of providing the highest cooling capacity for battery cooling during fast charging.

Figure 3:
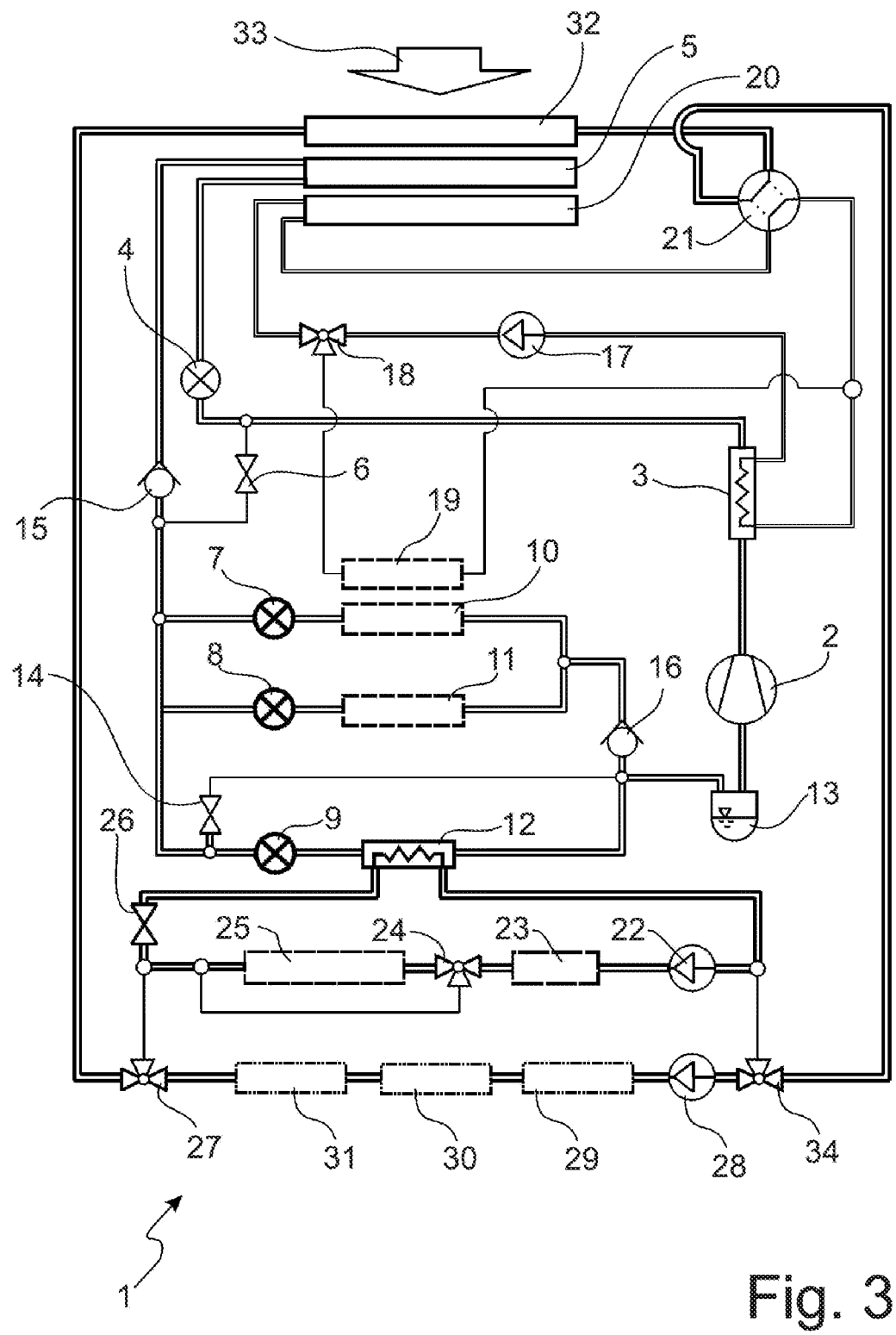
FIG. 3: shows a flow diagram of a moderate cooling capacity demand for cooling the passenger compartment and the battery.

FIG. 3 shows the flow diagram of an air conditioning and battery cooling arrangement 1 according to FIG. 1 at a moderate cooling capacity demand for cooling the passenger compartment and the battery.

In this operating mode, the 4/2-way coolant valve 21 is switched such that the A/C coolant circuit is completely disconnected from the electric drive train coolant circuit. Like in the previously described mode, the expansion device 4 between the coolant-cooled condenser 3 and the ambient heat exchanger 5 is fully opened and the bypass in the coolant circuit is inactive due to the closed stop valve 6, such that the coolant condensed in the condenser 3 is further chilled in the ambient heat exchanger 5.

In this operating mode, the two evaporators 10, 11 for conditioning the air in the interior of the passenger compartment and the chiller 12 for cooling the high-voltage battery by means of the battery cooler 25 are operated simultaneously. The high-voltage battery is actively cooled at temperatures below the ambient temperature. The waste heat of the electric drive train components 29, 30, 31 is passively released into the ambient air 33 in the drive train coolant radiator 32, without using the refrigeration circuit.

As an extension of the circuit according to FIG. 2, the refrigeration circuit in FIG. 3 is characterized by the simultaneous operation of three evaporators 10, 11, 12 in the refrigeration circuit. The operation of the evaporators 10, 11, 12 is coupled with the operation of the expansion devices 7, 8, 9. The non-return valve 16 prevents a shorted circuit at respective pressure differences within the refrigeration circuit.

The waste heat of the refrigeration circuit is actively transferred via the condenser 3 to the A/C coolant circuit and via the A/C coolant radiator 20 to the ambient air 33, whereas the drive train coolant radiator 32 of the electric drive train coolant circuit passively cools the components 29, 30, and 31 of the electric drive train and also releases their waste heat into the ambient air 33.

The electric drive train coolant circuit is operated as two single circuits of two substrands each in this operating mode. One circuit is formed by the coolant pump 28 with the electric drive components 29, 30, 31 and the substrand off the drive train coolant radiator 32 with the 4/2-way coolant valve 21. The other circuit, the battery cooling circuit, is driven by the coolant pump 22 and includes the battery cooler 25, the opened stop valve 26, and the chiller 12.

Figure 4:
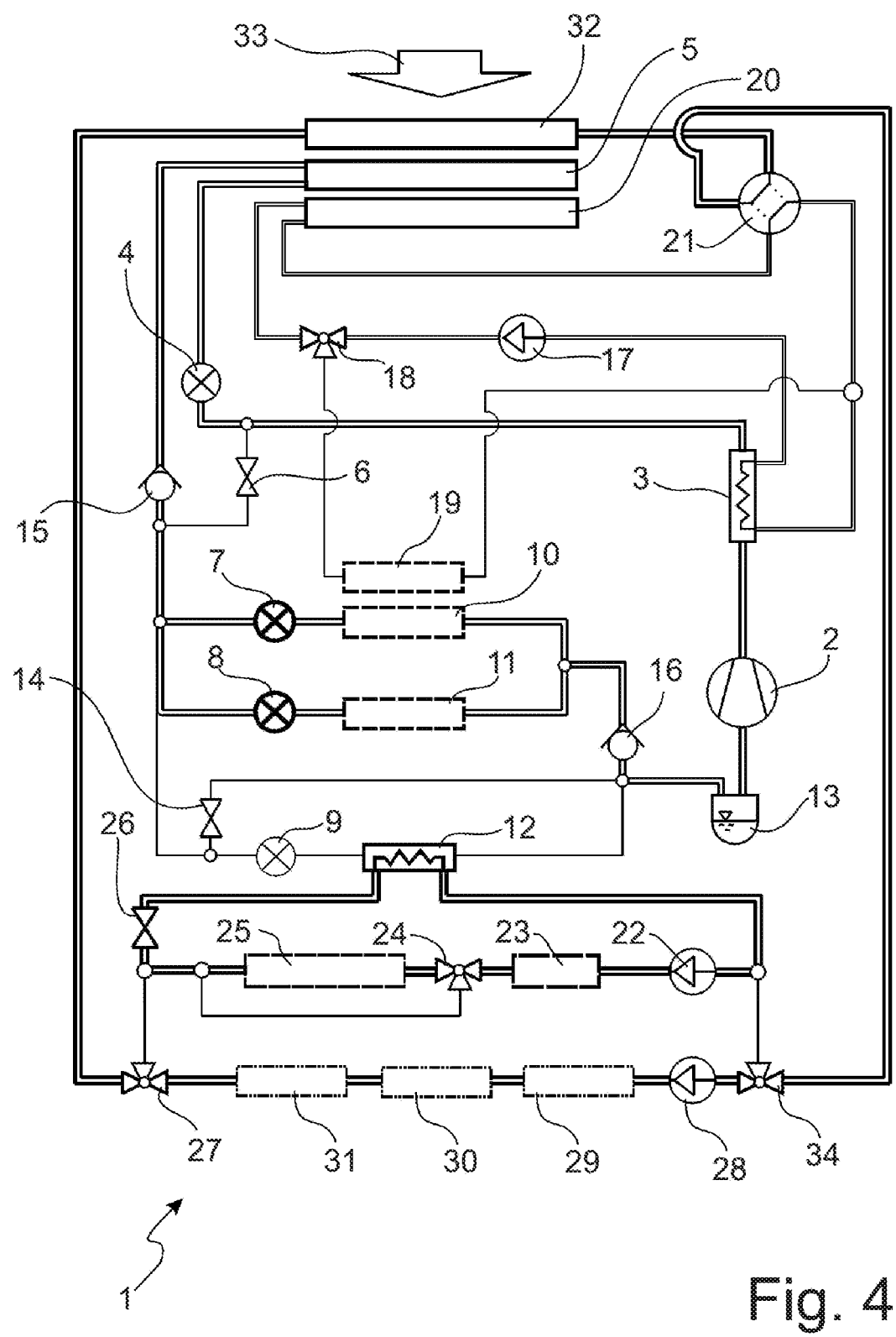
FIG. 4: shows a flow diagram of a moderate cooling capacity demand for cooling the passenger compartment.

FIG. 4 shows a flow diagram of the air conditioning and battery cooling arrangement 1 according to FIG. 1 at a moderate cooling capacity demand for cooling the passenger compartment. Unlike the operating modes mentioned above, the chiller 12 of the refrigeration circuit for battery cooling is not operated actively, such that the battery cooling circuit is not cooled by the coolant circuit in this case. Instead, the entire capacity of the refrigeration circuit is used for cooling by the front evaporator 10 and by the rear evaporator 11. Once again the expansion device 4 is fully opened, such that the compressed refrigerant gas is condensed in the condenser 3 and chilled in the ambient heat exchanger 5, then flows from the latter via the expansion devices 7 and 8 into the evaporators 10 and 11. The A/C coolant circuit absorbs the condensation heat from the refrigeration circuit via the condenser 3 and transports it via the substrand with the coolant pump 17 to the A/C coolant radiator 20, where the heat is released into the ambient air 33.

The 4/2-way coolant valve 21 closes the circulation of the coolant to the condenser 3 after the A/C coolant radiator 20.

Regardless of the substrand with the battery cooler 25 of the coolant circuit, the electric drive train coolant circuit for passive cooling of the inverter 29, the converter 30, and the electric motor heat exchanger 31 is driven by the coolant pump 28 and conducted via the drive train coolant radiator 32, thereby passively cooling the components of the electric drive train. The 4/2-way coolant valve 21 closes the circuit towards the components of the electric drive train, wherein the 3-way valves 27 and 34 are each switched to disconnection from the battery cooling circuit and to through-flow for the components of the electric drive train.

To exclude the chiller 12 from the refrigeration circuit in this mode, the expansion device 9 positioned upstream of the chiller 12 is fully closed, such that the refrigerant can only flow via the evaporators 10 and 11 to the compressor 2.

Figure 5:
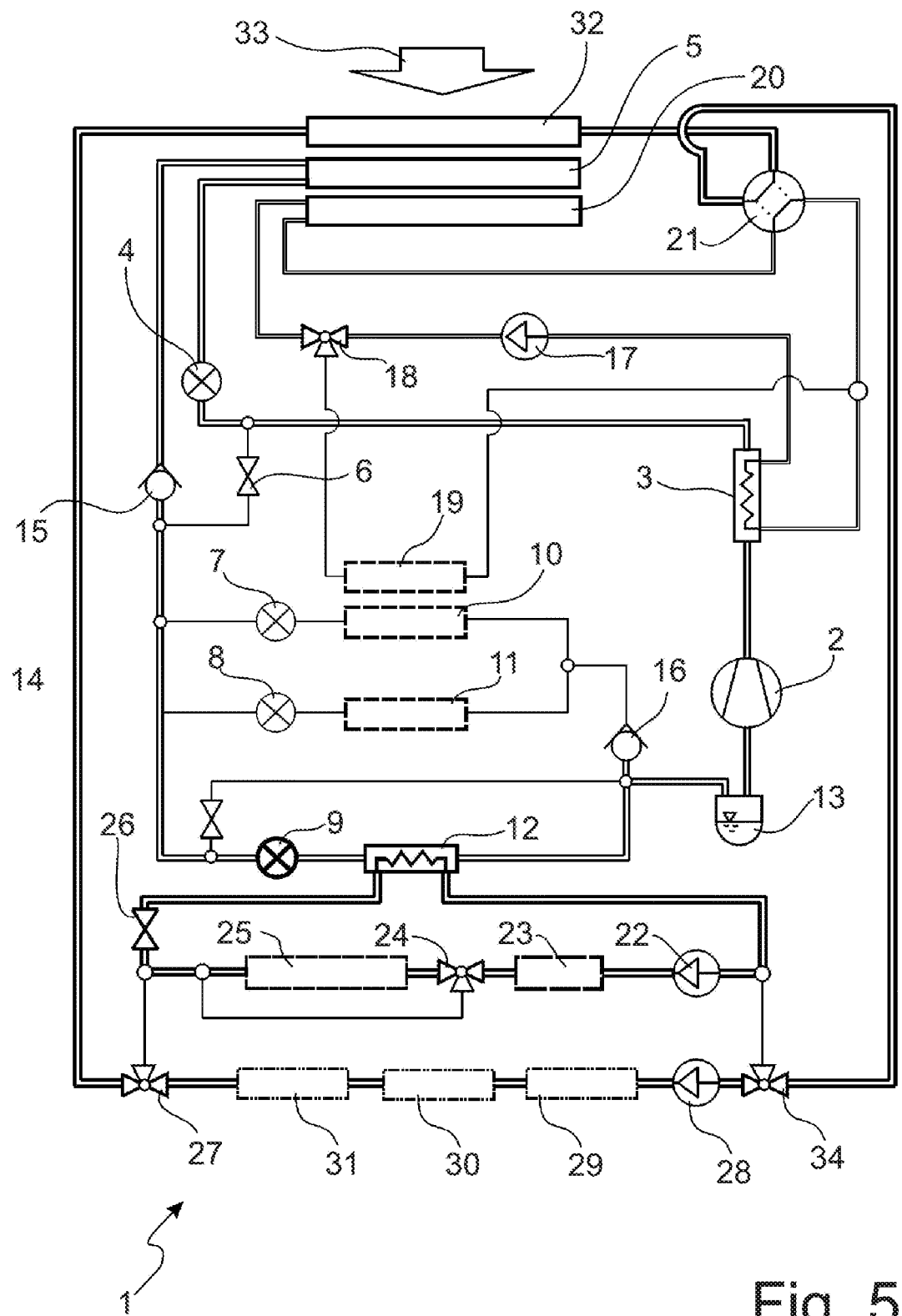
FIG. 5: shows a flow diagram of a moderate cooling capacity demand for active battery cooling.

FIG. 5 shows a flow diagram of the air conditioning and battery cooling arrangement 1 according to FIG. 1 at a moderate cooling capacity demand for active battery cooling. Unlike the embodiment according to FIG. 4 described above, the expansion device 9 is opened in FIG. 5 to include the chiller 12 in the refrigeration circuit. Instead, the expansion devices 7 and 8 are closed to exclude the evaporators for air conditioning the passenger compartment of the vehicle from refrigerant supply, such that the entire refrigeration capacity from the refrigeration circuit is available to the battery cooler 25 via the chiller 12. In this operating mode, the expansion devices 7 and 8 positioned upstream of the evaporators 10 and 11 are fully closed, such that the refrigerant can only flow via the chiller 12 to the compressor 2. In this manner, the high-voltage battery is actively cooled via the refrigeration circuit.

Figure 6:
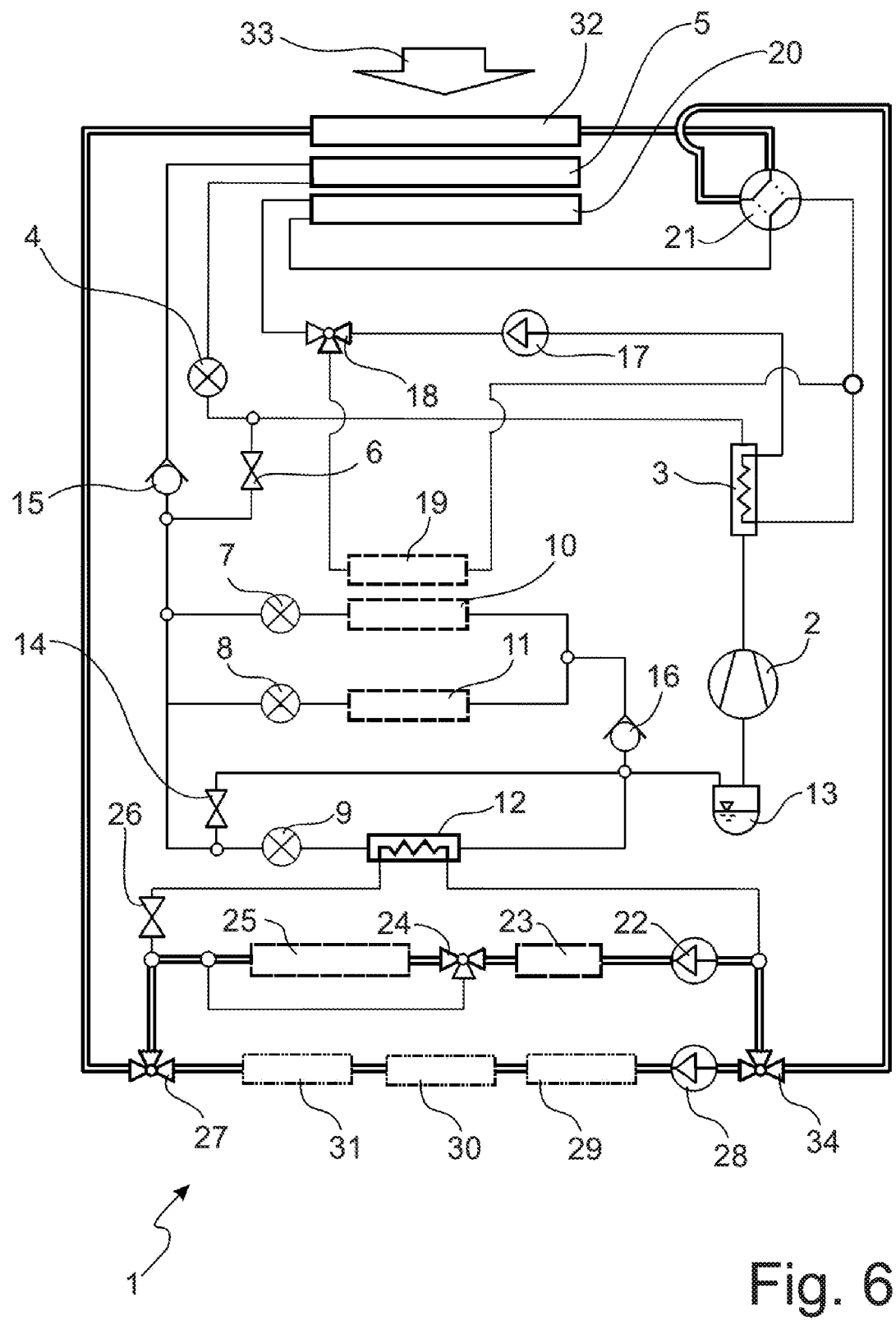
FIG. 6: shows a flow diagram of passive battery cooling.

FIG. 6 shows the flow diagram of passive battery cooling for an air conditioning and battery cooling arrangement 1 according to FIG. 1. In this operating mode, the high-voltage battery is cooled via the substrand with the battery cooler 25, and the electric drive train components 29, 30, and 31 are passively cooled parallel to the battery cooler 25 via the drive train coolant radiator 32 in that the waste heat of these components is released into the ambient air 33. The stop valve 26 between the battery cooler 25 and the chiller 12 remains closed, such that the coolant flow, after being split up in the 3-way valve 34 and flowing in parallel through the battery cooler 25 and the electric drive train components inverter 29, converter 30, and electric motor heat exchanger 31, is reunited via the 3-way valve 27 and conducted to the drive train coolant radiator 32.

Figure 7:
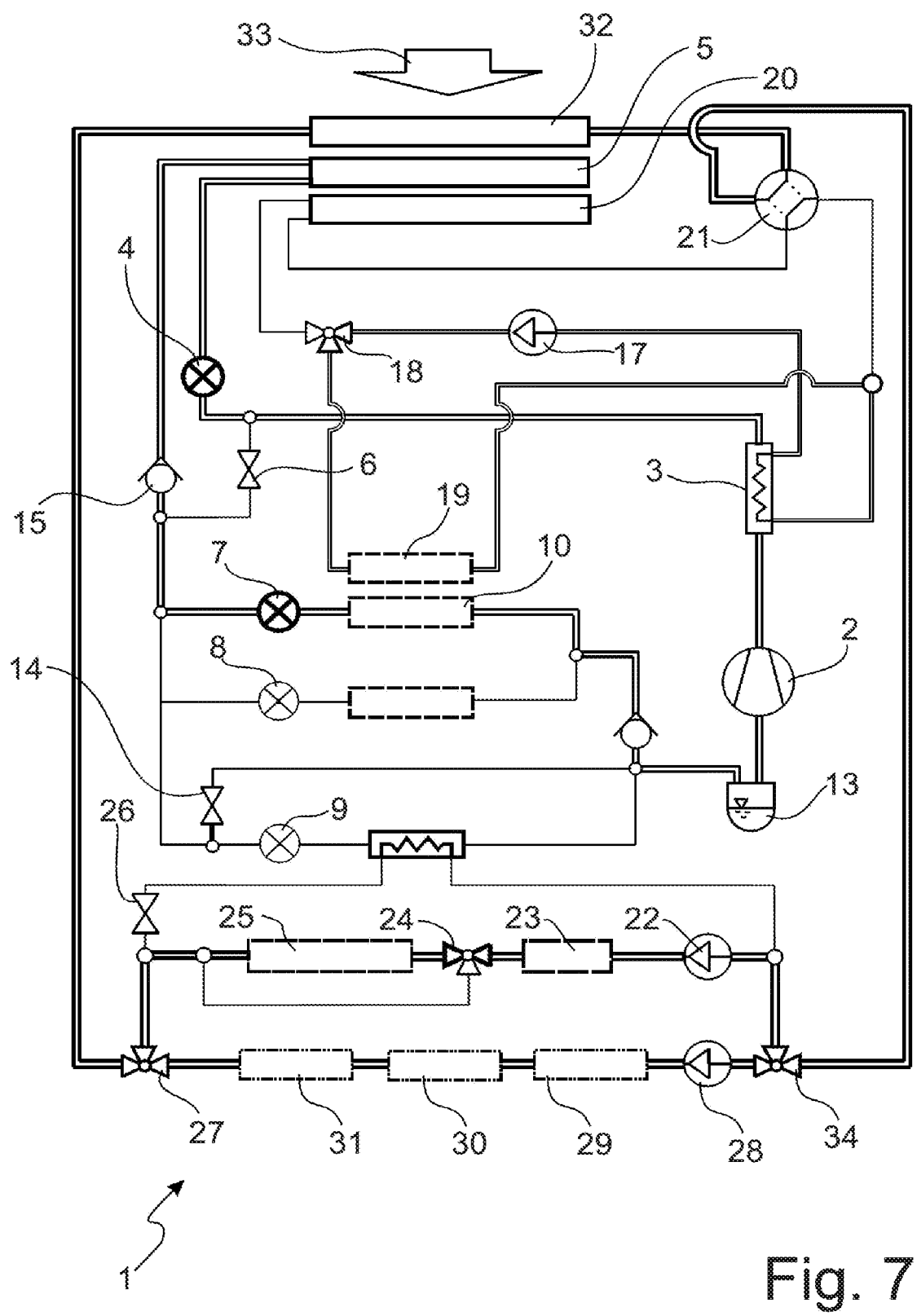
FIG. 7: shows a flow diagram of reheat operation at moderate ambient temperatures.

FIG. 7 shows the flow diagram of the air conditioning and battery cooling arrangement 1 according to FIG. 1 in reheat mode at moderate ambient temperatures. The refrigeration capacity demanded at moderate ambient temperatures is typically higher than the heating capacity required for reheating. This mode is also called reheat in refrigeration system operation. The heat transferred in the condenser 3 into the A/C coolant circuit is completely transferred in the heating heat exchanger 19 to the air which was cooled and dehumidified in the front evaporator 10 with expansion device 7 to allow reheating of the air. When reheating in air conditioning system operation, excess unusable condensation heat is released into the ambient air 33 in the ambient heat exchanger 5. The expansion device 4 between the condenser 3 and the ambient heat exchanger 5 is adjusted to a respective minimum pressure level in the ambient heat exchanger 5, which level is necessary to set an appropriate ratio of usable and excess condensation heat. At moderate ambient temperatures, the high-voltage battery can be passively cooled by the drive train coolant radiator 32, as in the procedure described above. The battery cooler 25 and the electric drive train components are connected as in the mode described above according to FIG. 6.

Figure 8:
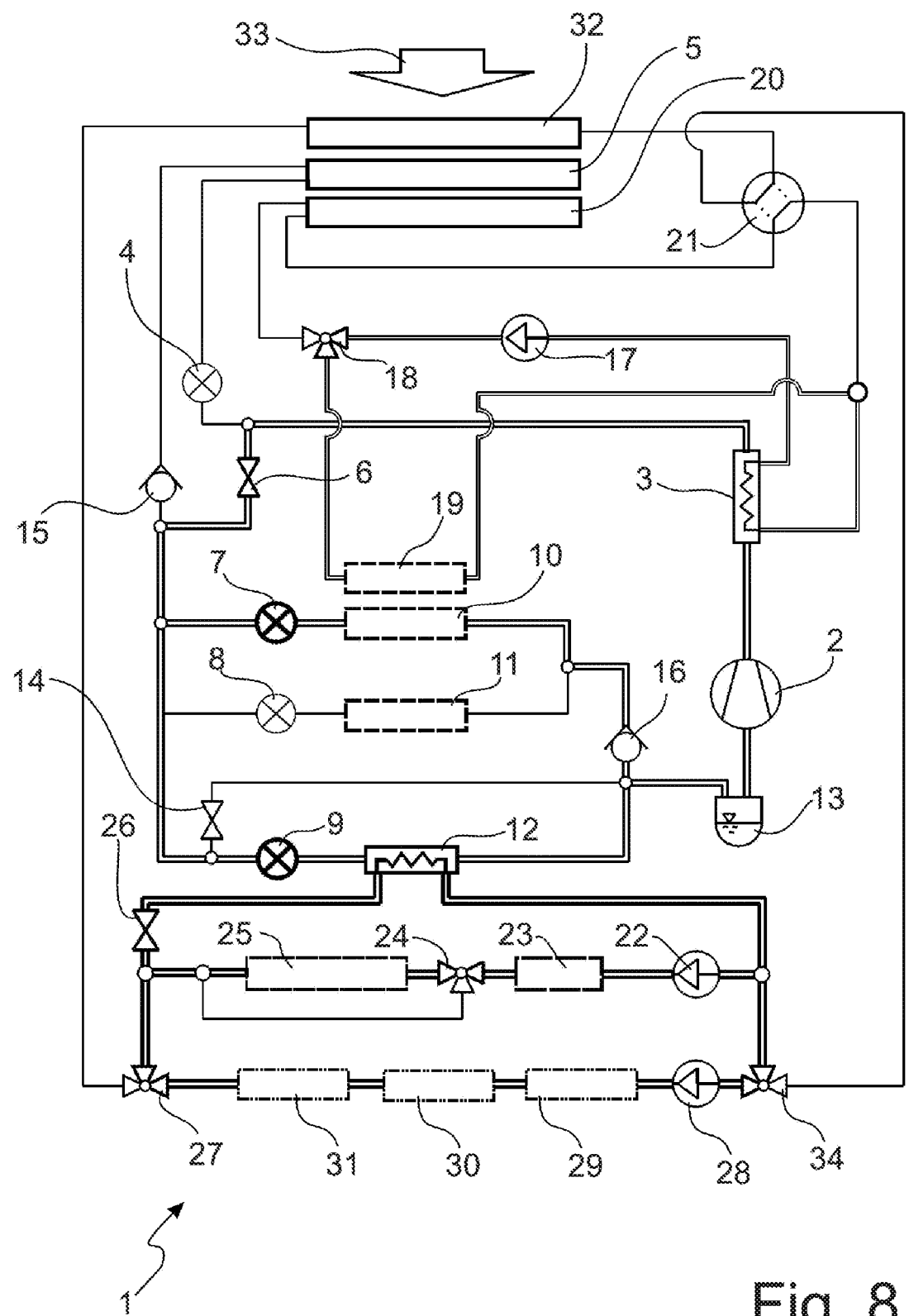
FIG. 8: shows a flow diagram of reheat operation at low ambient temperatures.

FIG. 8 shows the flow diagram of the air conditioning and battery cooling arrangement 1 according to FIG. 1 in reheat mode at low ambient temperatures. At cold ambient temperatures, the heating capacity required for reheating the air is typically higher than the cooling capacity required for dehumidifying the air. This constellation is called reheat in heat pump operation. The heat transferred in the condenser 3 into the A/C coolant circuit is completely transferred in the heating heat exchanger 19 to the air which was cooled and dehumidified in the evaporator 10 with expansion device 4 to allow reheating of the air. The expansion device 4 between the condenser 3 and the ambient heat exchanger 5 is completely closed, such that the refrigerant flows via the bypass through the opened stop valve 6 through the front evaporator 10 and the chiller 12 back to the compressor 2. In this manner, the additional evaporation heat needed for reheating in heat pump operation is absorbed in the chiller 12, which heat is mainly composed via the battery cooler 25 of waste heat from the electric drive train components inverter 29, converter 30, and electric motor heat exchanger 31 and of the high-voltage battery. In this way, the system allows converting any waste heat produced into usable heat for vehicle passenger compartment heating via the heat pump effect in cold ambient temperatures and thus to significantly increase the overall efficiency and range of the electric vehicle. The radiators of the overall system, the ambient heat exchanger 5, the A/C coolant radiator 20, and the drive train coolant radiator 32 are completely put out of operation, such that no waste heat of the system is released to the ambient air 33.

Figure 9:
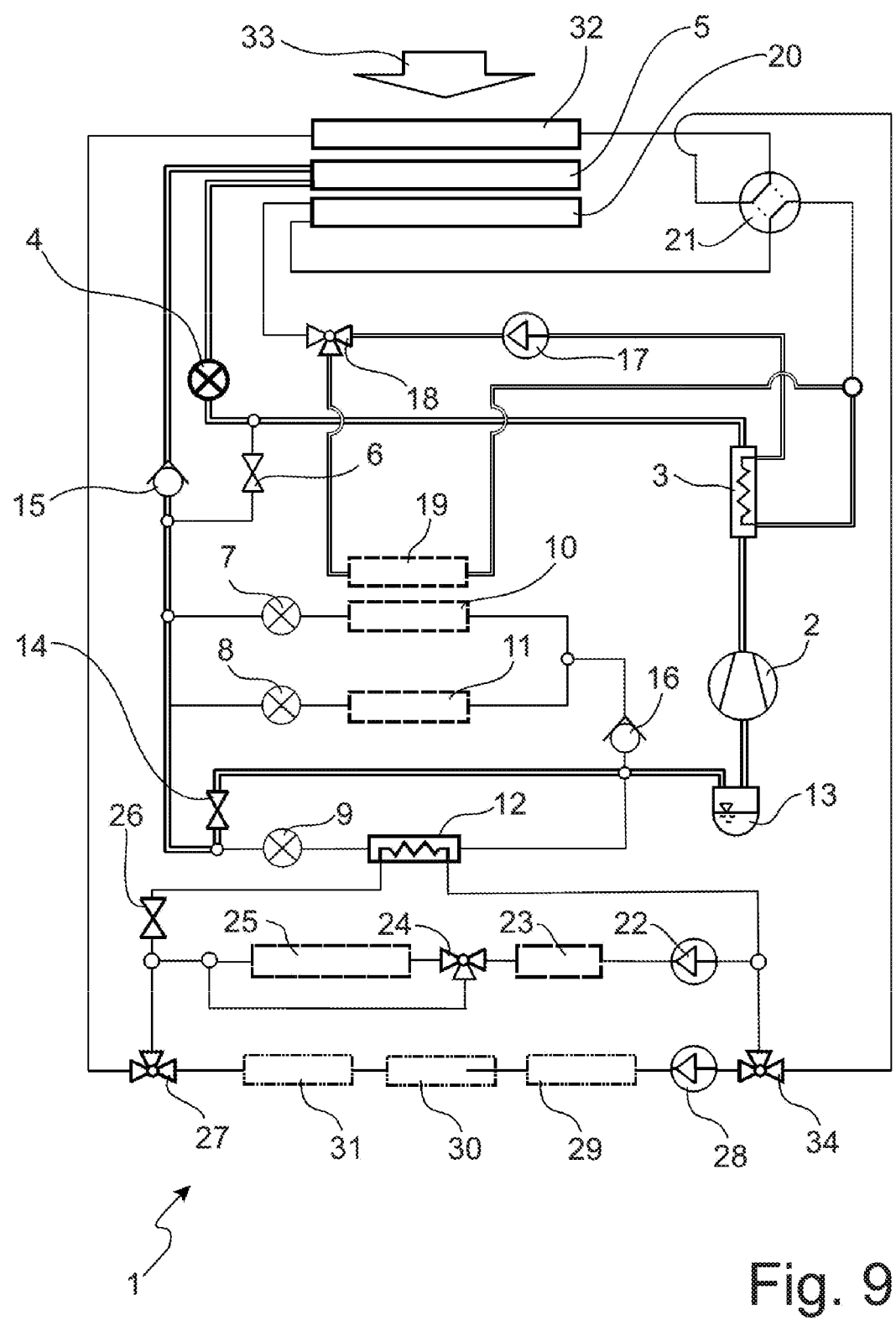
FIG. 9: shows a flow diagram of heating operation at cold ambient temperatures using ambient air as heat source.

FIG. 9 shows the flow diagram of the air conditioning and battery cooling arrangement 1 according to FIG. 1 in reheat mode at cold ambient temperatures, with the ambient air as the heat source. In heating operation, the heat transferred to the A/C coolant circuit in the condenser 3 is completely transferred to the heating heat exchanger 19 and to the interior air. The expansion device 4 between the condenser 3 and the ambient heat exchanger 5 is adjusted to a pressure level in the ambient heat exchanger 5, which level is necessary to absorb evaporation heat from the ambient air 33 in the ambient heat exchanger 5. The refrigerant is completely evaporated or overheated, respectively, by absorbing heat from the ambient air 33 at a low pressure level. The overheated refrigerant flows via a bypass to the chiller 12 when the stop valve 26 is opened and the expansion device 9 is closed and via the low-pressure accumulator 13 back to the compressor 2. The entire electric drive train coolant circuit is not operated.

Figure 10:
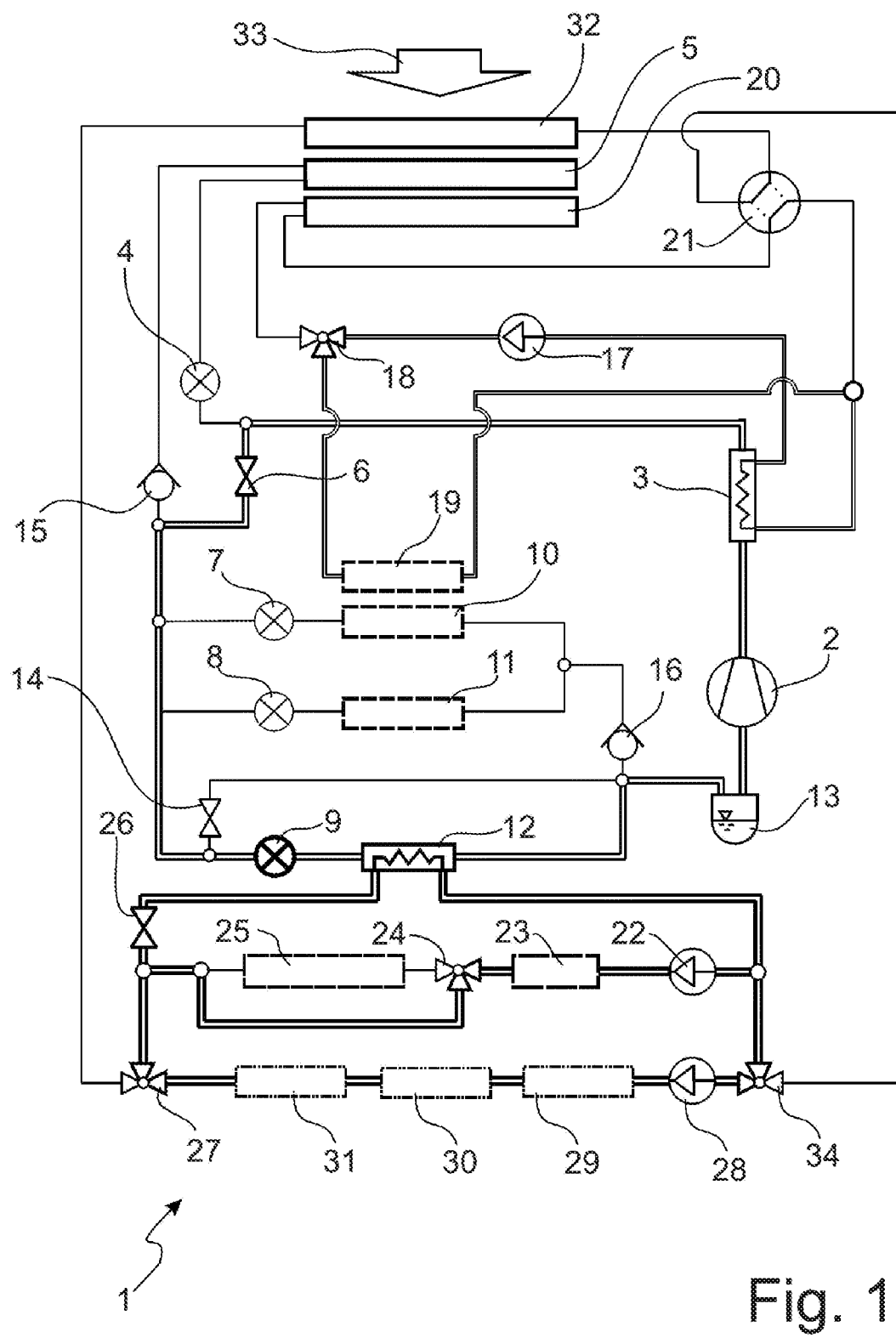
FIG. 10: shows a flow diagram of heating operation at cold ambient temperatures using waste heat from the electric drive train as heat source.

FIG. 10 shows the flow diagram of the air conditioning and battery cooling arrangement 1 according to FIG. 1 in heating mode at cold ambient temperatures, with the waste air from the electric drive train as the heat source. In heating operation, the heat transferred to the A/C coolant circuit in the condenser 3 is completely transferred to the interior air in the heating heat exchanger 19. The expansion device 4 between the condenser 3 and the ambient heat exchanger 5 is completely closed, such that the refrigerant flows via a bypass to the ambient heat exchanger 5 through the opened stop valve 6 after being restricted in the expansion device 9 through the chiller 12 back to the compressor 2. The evaporation heat required for heat pump operation is completely absorbed in the chiller 12, wherein this heat is mainly composed of the waste heat from the electric drive train components 29, 30, and 31. The 3-way valve 24 upstream of the battery cooler 25 is connected such that either no or as little volumetric flow of coolant as possible flows via the battery cooler 25. This is required to prevent complete cooling down of the battery due to heat transfer in this operating situation. At ambient temperatures below 5° C., waste heat or utilization of residual heat from the high-voltage battery is often undesirable, since the electric resistance of the cells is decisively determined by the temperature, which resistance tends to rise at cold temperatures and deteriorates the efficiency of the high-voltage battery.

Figure 11:
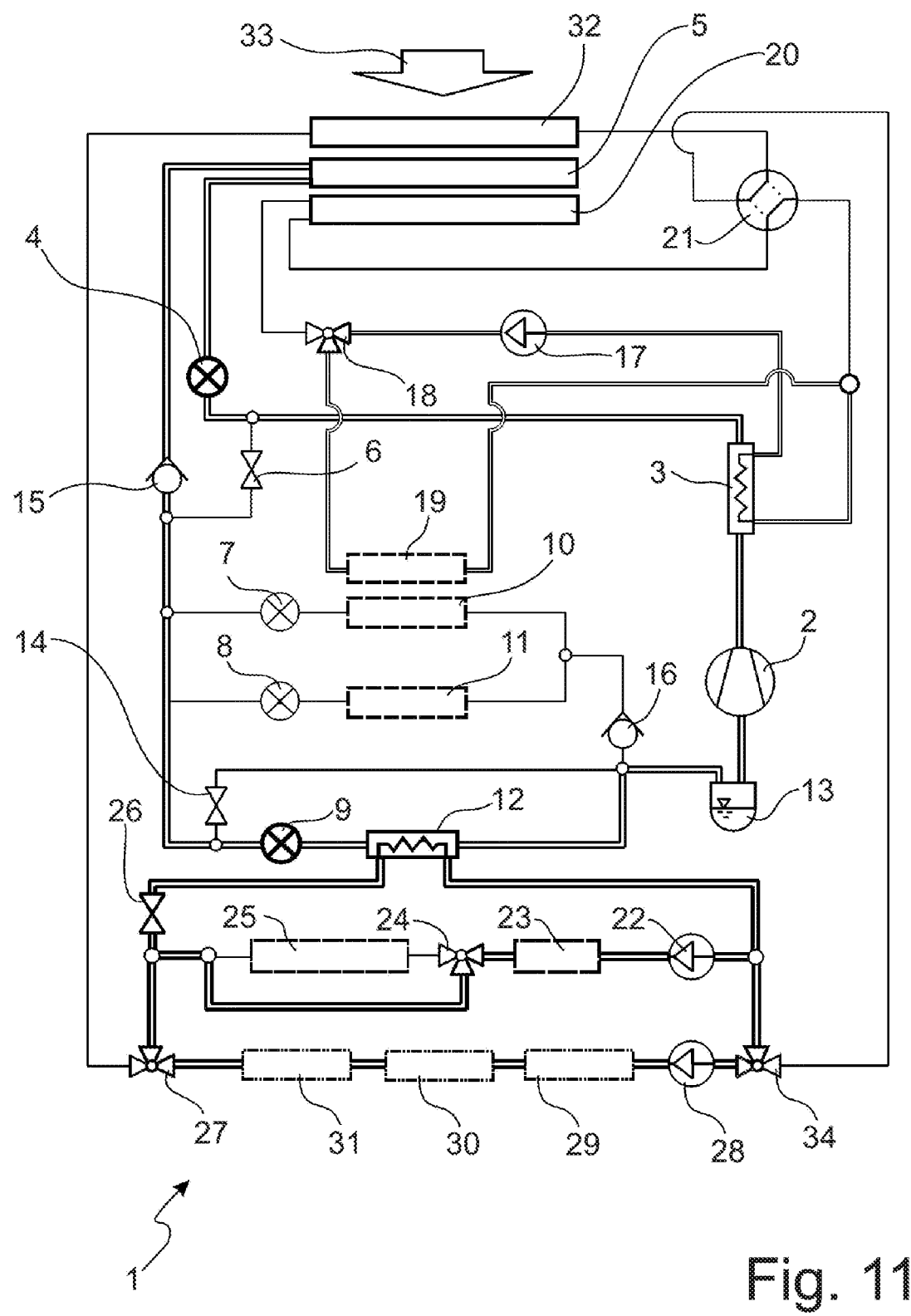
FIG. 11: shows a flow diagram of heating operation at cold ambient temperatures using ambient air and waste heat from the electric drive train components as heat source.

FIG. 11 shows the flow diagram of the air conditioning and battery cooling arrangement 1 according to FIG. 1 in heating mode at cold ambient temperatures, with the ambient air 33 and the waste heat from the electric drive train components 29, 30, 31 as the heat source.

In heating operation, the heat transferred to the coolant circuit in the condenser 3 is completely transferred to the heating heat exchanger 19 and to the interior air of the passenger compartment. In this operating mode, both the ambient air 33 and the waste heat from the electric drive train components 29, 30, and 31 is used as the heat source for evaporating the refrigerant. The expansion devices 4 and 9 upstream of the ambient heat exchanger 5 and the chiller 12 are adjusted such that as much heat as possible can be taken from the respective source. In cold temperatures, the waste heat from the high-voltage battery cannot be used as evaporation heat source for the refrigerant. Therefore, the volumetric flow of coolant must bypass the battery cooler 25 via a bypass in this case as well, the 3-way valve 24 once again being switched accordingly.

Figure 12:
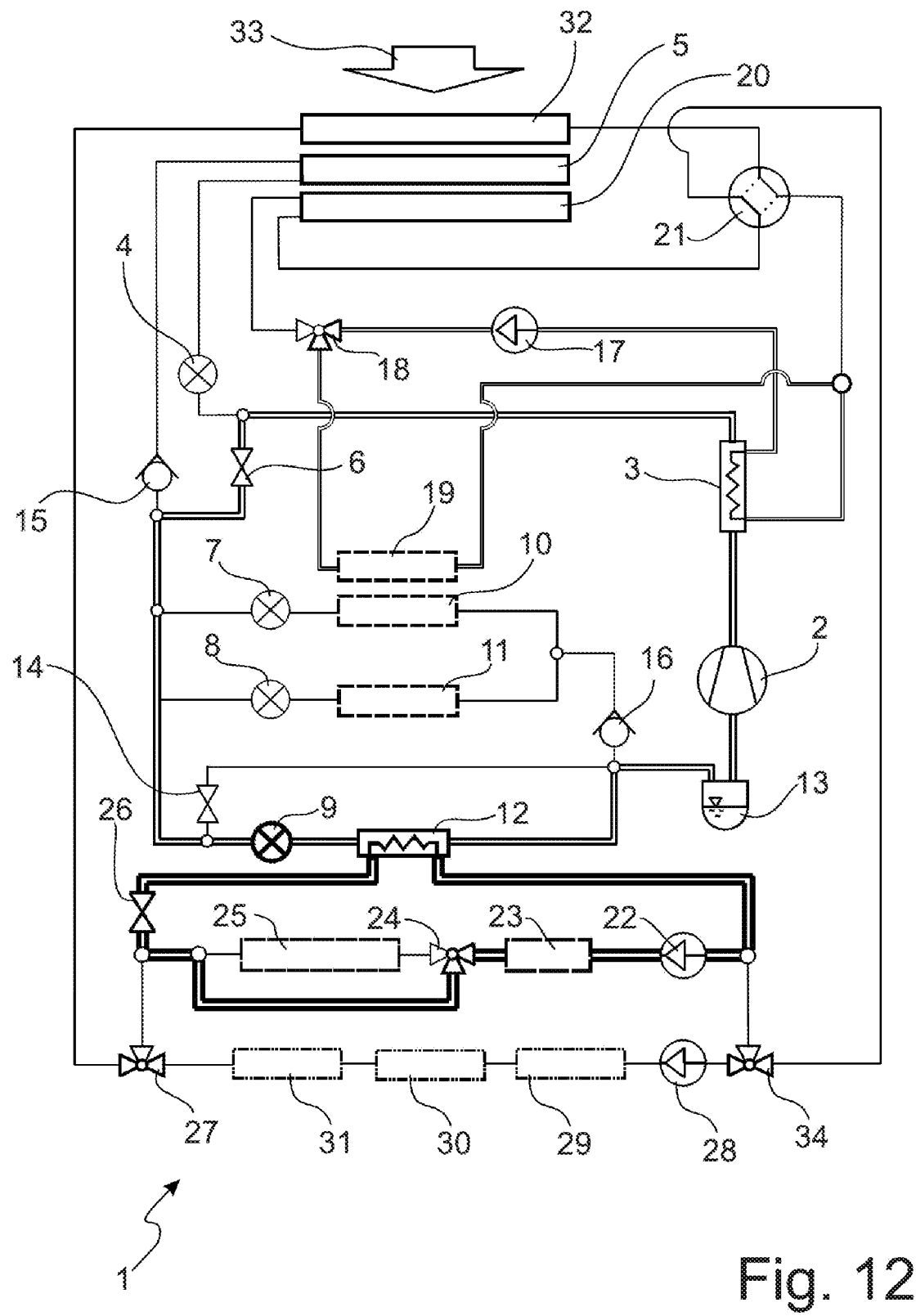
FIG. 12: shows a flow diagram at very cold ambient temperatures in boost mode.

FIG. 12 shows a flow diagram of an air conditioning and battery cooling arrangement 1 according to FIG. 1 in heating mode at very cold ambient temperatures in the so-called boost mode. In heating operation, the heat transferred to the A/C coolant circuit in the condenser 3 is completely transferred to the interior air in the heating heat exchanger 19. The expansion device 4 between the condenser 3 and the ambient heat exchanger 5 is completely closed, such that the refrigerant flows via the bypass via the opened stop valve 6 through the chiller 12 back to the compressor 2. The evaporation heat required for heating operation is completely absorbed in the chiller 12. The evaporation heat is provided in the chiller 12 by an electric coolant heater, which is designated as a heating device 23. The heating capacity of the heat pump system can be significantly increased by using the electric coolant heater or heating device 23. In order to achieve fast or dynamic heating up of the passenger compartment, the 3-way valve 24 is diverted via the bypass upstream of the battery cooler 25, such that the coolant flow bypasses the battery cooler 25. This minimizes heat losses via the battery, and as much heat as possible is released into the refrigeration circuit in the chiller 12.

Figure 13:
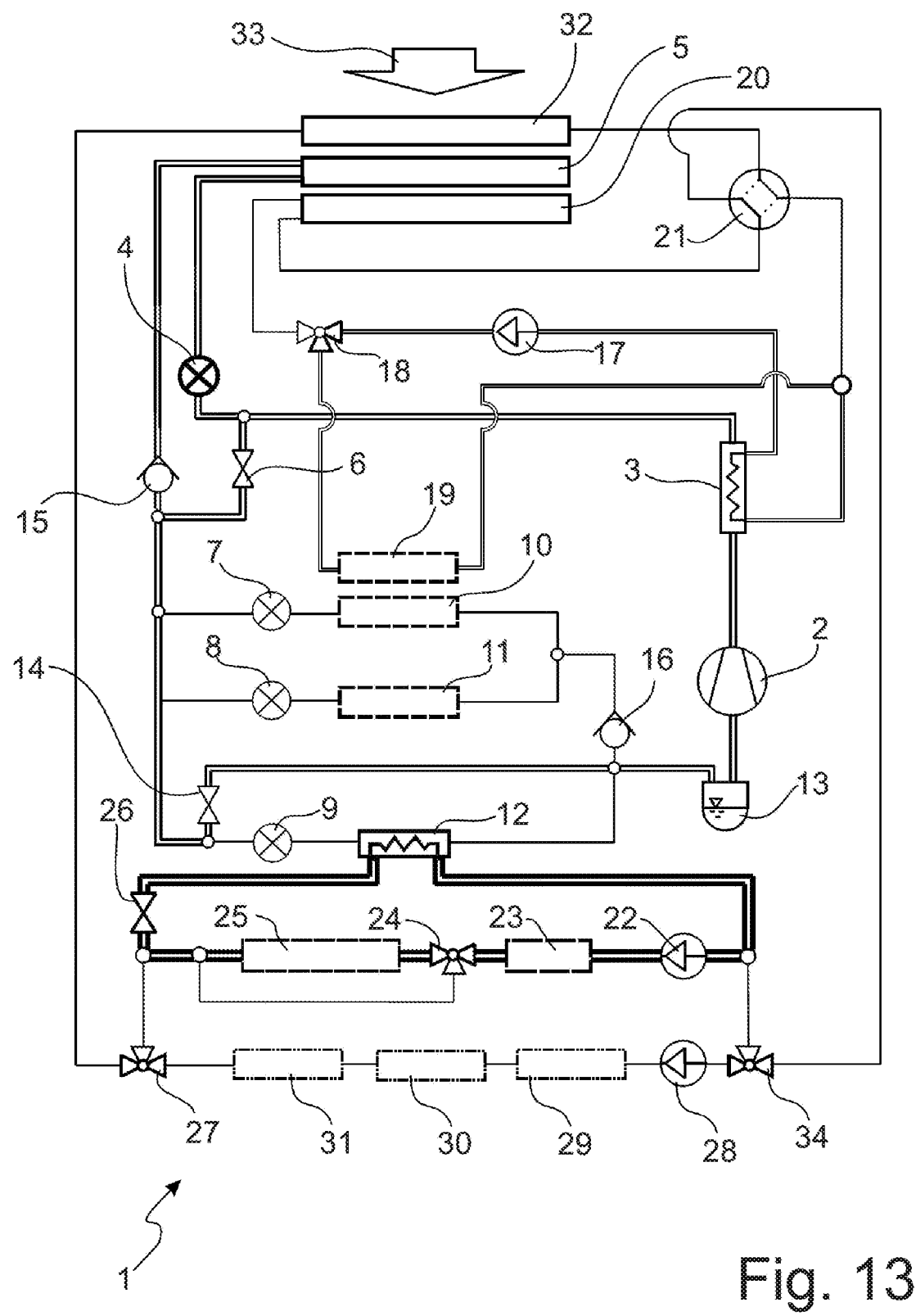
FIG. 13: shows a flow diagram of active battery heating.

FIG. 13 shows the flow diagram of the air conditioning and battery cooling arrangement 1 according to FIG. 1 in heating mode for active battery heating. In this operating mode, the high-voltage battery is actively heated up by the heating device 23 via the battery cooler 25. To prevent heat removal by the coolant circuit, the chiller 12 prevents the mass flow of refrigerant in that the expansion device 9 is closed. The refrigerant flows via the opened stop valve 14 in the bypass to the chiller 12, to the low pressure accumulator 13, and the compressor 2. The evaporation heat required for heating operation to supply heat to the passenger compartment via the heating heat exchanger 19 is absorbed from the ambient air 33 in the ambient heat exchanger 5. The refrigerant is completely evaporated or overheated, respectively, by absorbing heat from the ambient air 33 at a low pressure level. The expansion device 4 downstream of the condenser 3 is activated accordingly and expands the mass flow of refrigerant upstream of the ambient heat exchanger 5 to the required low pressure level.

Figure 14:
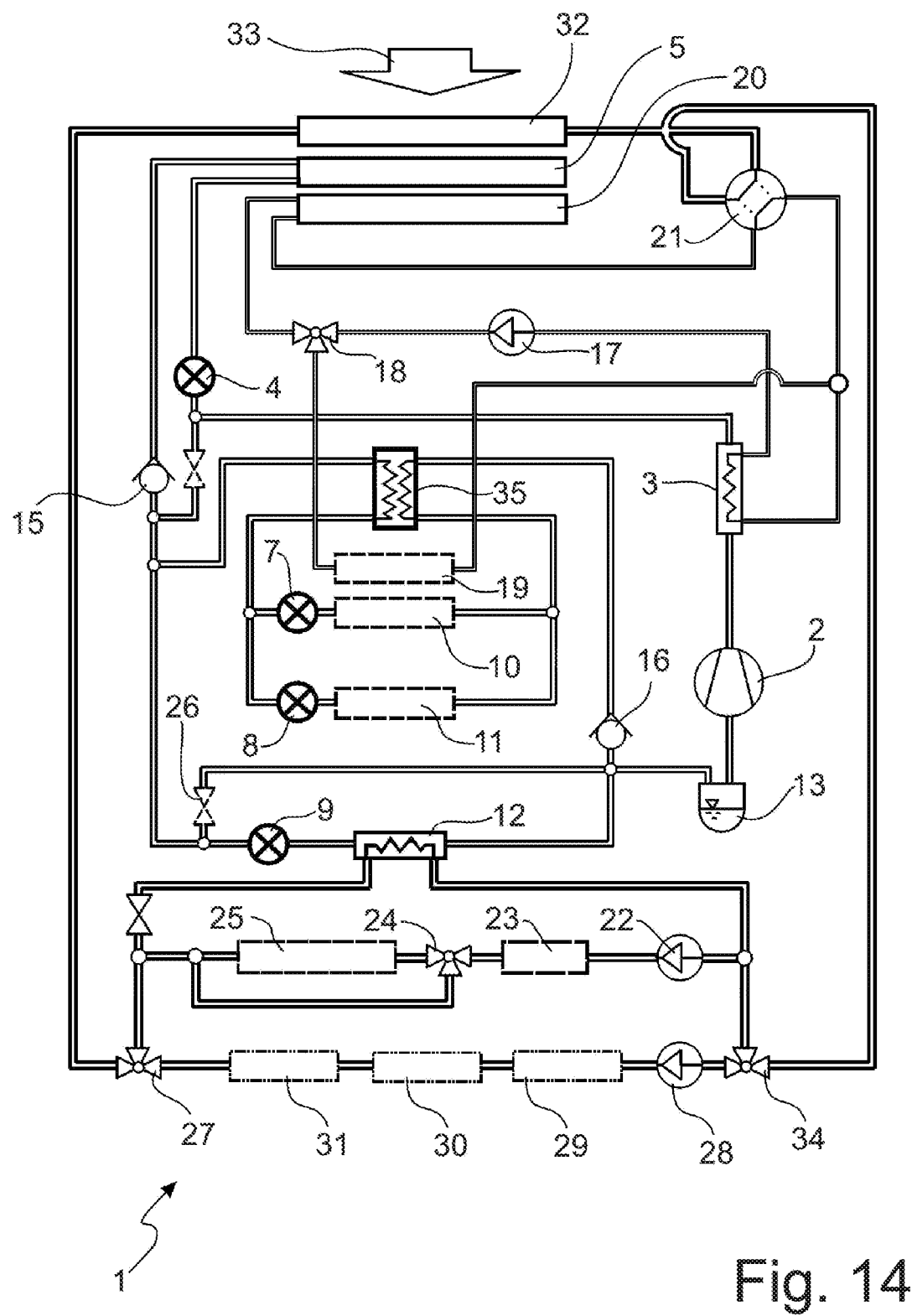
FIG. 14: shows a flow diagram with an internal heat exchanger on the high pressure side downstream of the ambient heat exchanger.

In FIG. 14, the refrigeration circuit of the air conditioning and battery cooling arrangement 1 is extended by an internal heat exchanger 35. The internal heat exchanger 35 is positioned on the high pressure side down stream of the ambient heat exchanger 5 and upstream of the expansion devices 7 and 8 of the evaporators 10 and 11 in the refrigeration circuit. Except for this extension, which makes thermodynamic sense based on the specific refrigerant used, the system matches the embodiment according to FIG. 1.

Figure 15:
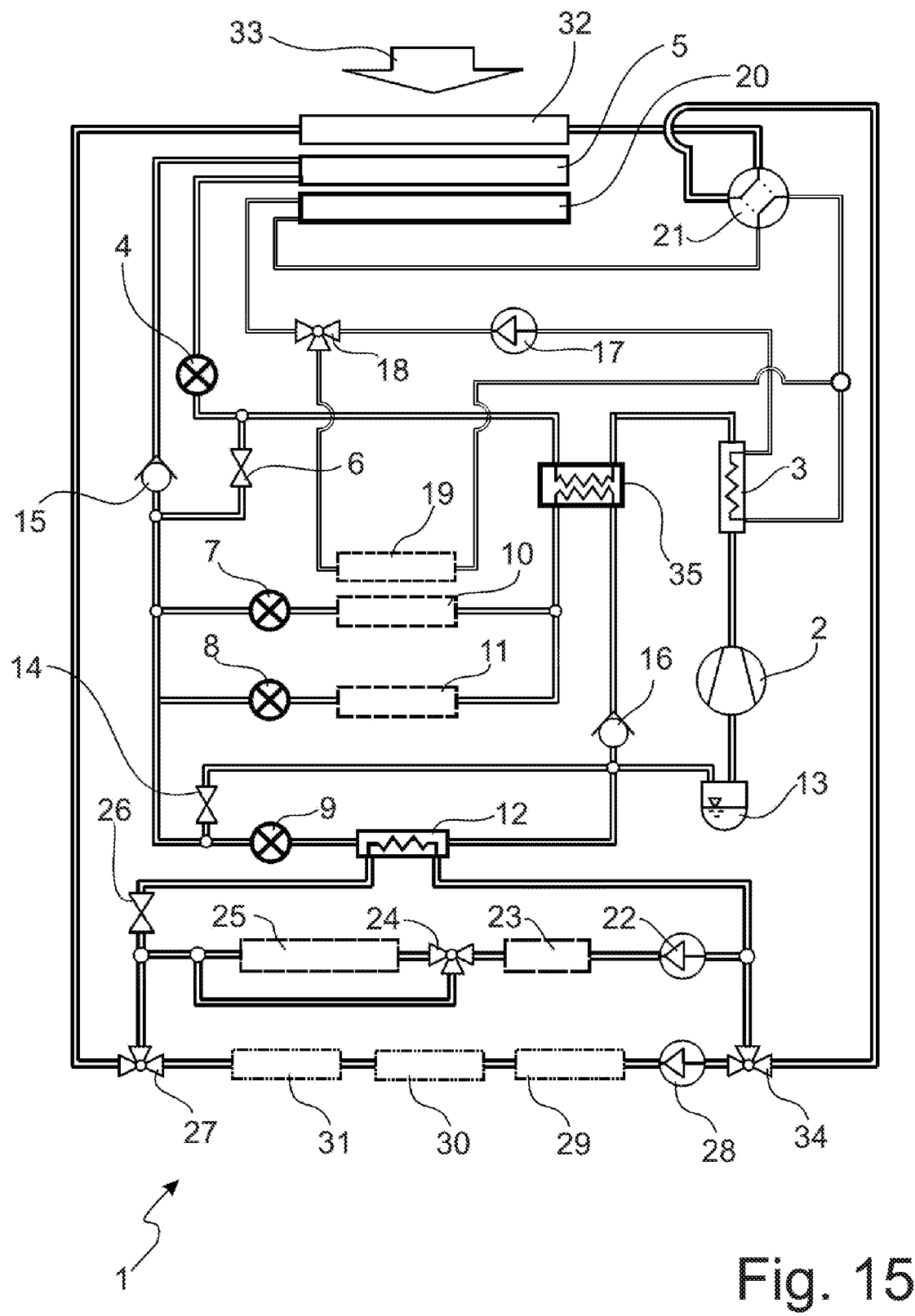
FIG. 15: shows a flow diagram with an internal heat exchanger on the high pressure side downstream of the condenser.

FIG. 15 shows the air conditioning and battery cooling arrangement 1 according to FIG. 1, once again extended by an internal heat exchanger 35, which is inserted on the high pressure side between the condenser 3 and the expansion device 4, that is, upstream of the ambient heat exchanger 35. The other components relate to the same system, as shown in FIG. 1.

The refrigeration capacity of the system can be increased by using an internal heat exchanger 35, depending on the refrigerant used.

Figure 16:
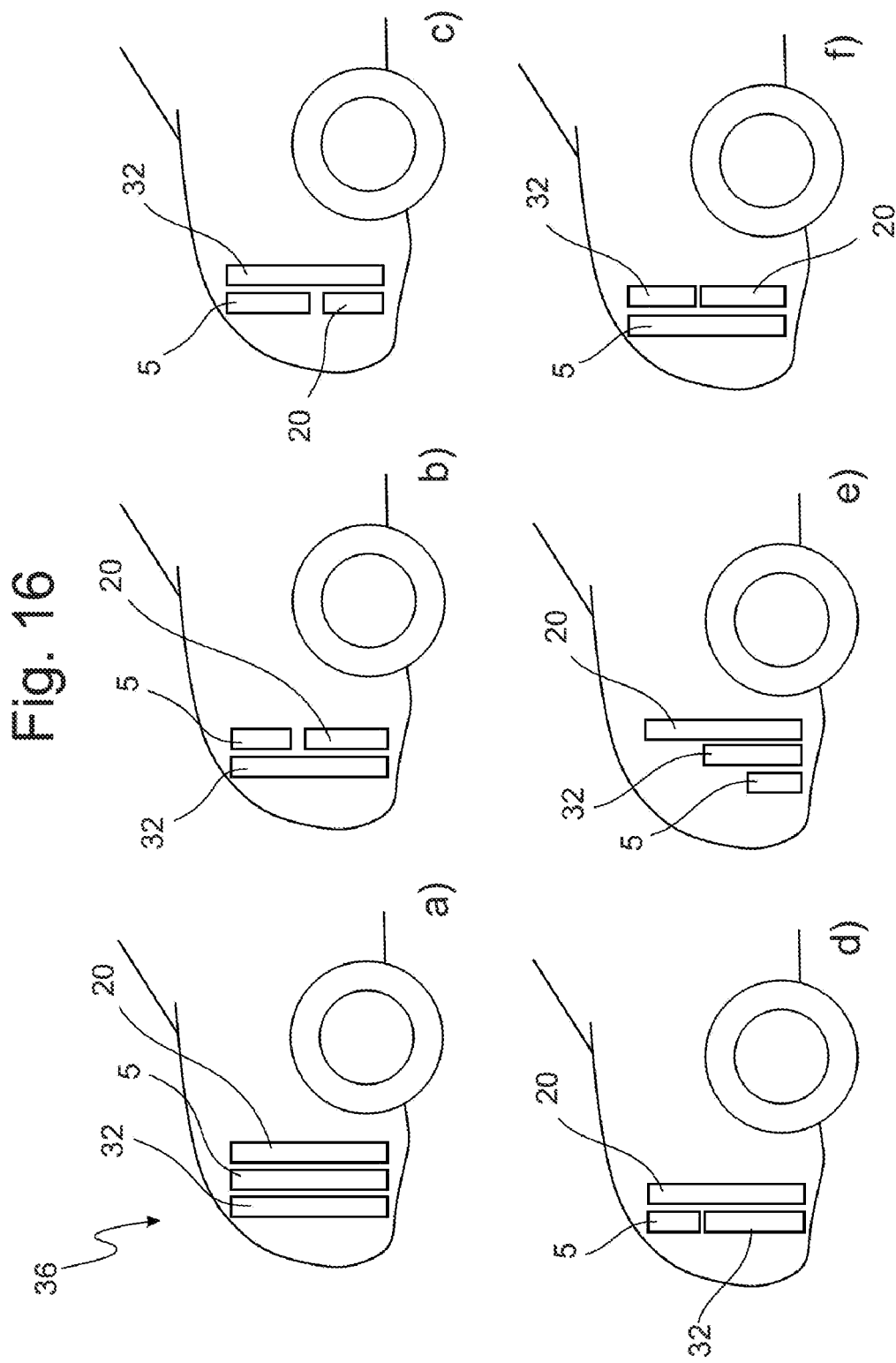
FIGS. 16 *a* to *f*: shows a schematic sketch of radiator arrangements in the front region of the motor vehicle.

FIGS. 16 *a)* to *f)* show various arrangements of radiators in the area of the vehicle front 36 of the motor vehicle.

FIG. 16 *a)* shows the arrangement of the drive train coolant radiator 32 upstream of the ambient heat exchanger 5 and the A/C coolant radiator 20 in three rows one after the other, such that the cooling air flow of the ambient air passes in series through the radiators.

In variant b), the drive train coolant radiator 32 is implemented in the first row across the entire front face, whereas the ambient heat exchanger 5 and the A/C coolant radiator 20 share the area through which the air flows in the second row.

According to variant c) and unlike variant b), the air flow first passes through the radiators in the first plane 20 and 5 and then through the drive train coolant radiator 32 in the second plane.

Variant d) combines the drive train coolant radiator 32 and the ambient heat exchanger 5 in the first through-flow plane, whereas the A/C coolant radiator 20 is arranged across the entire area in the second plane.

Variant e) relates to a tiered arrangement of the radiators 5, 32, and 20, wherein an additional end surface is available in the second and third rows, respectively, for flow passing through the radiators compared to the preceding row.

Variant f) finally shows that the ambient heat exchanger 5 forms the first row and front surface of the radiator unit, whereas the area through which coolant flows in the second plane is shared by the A/C coolant radiator 20 and the drive train coolant radiator 32, with the particularity that the depth of the drive train coolant radiator 32 extends into a third plane and has a greater through-flow depth compared to the other two radiators 5 and 20 which are used herein.

Figure 17:
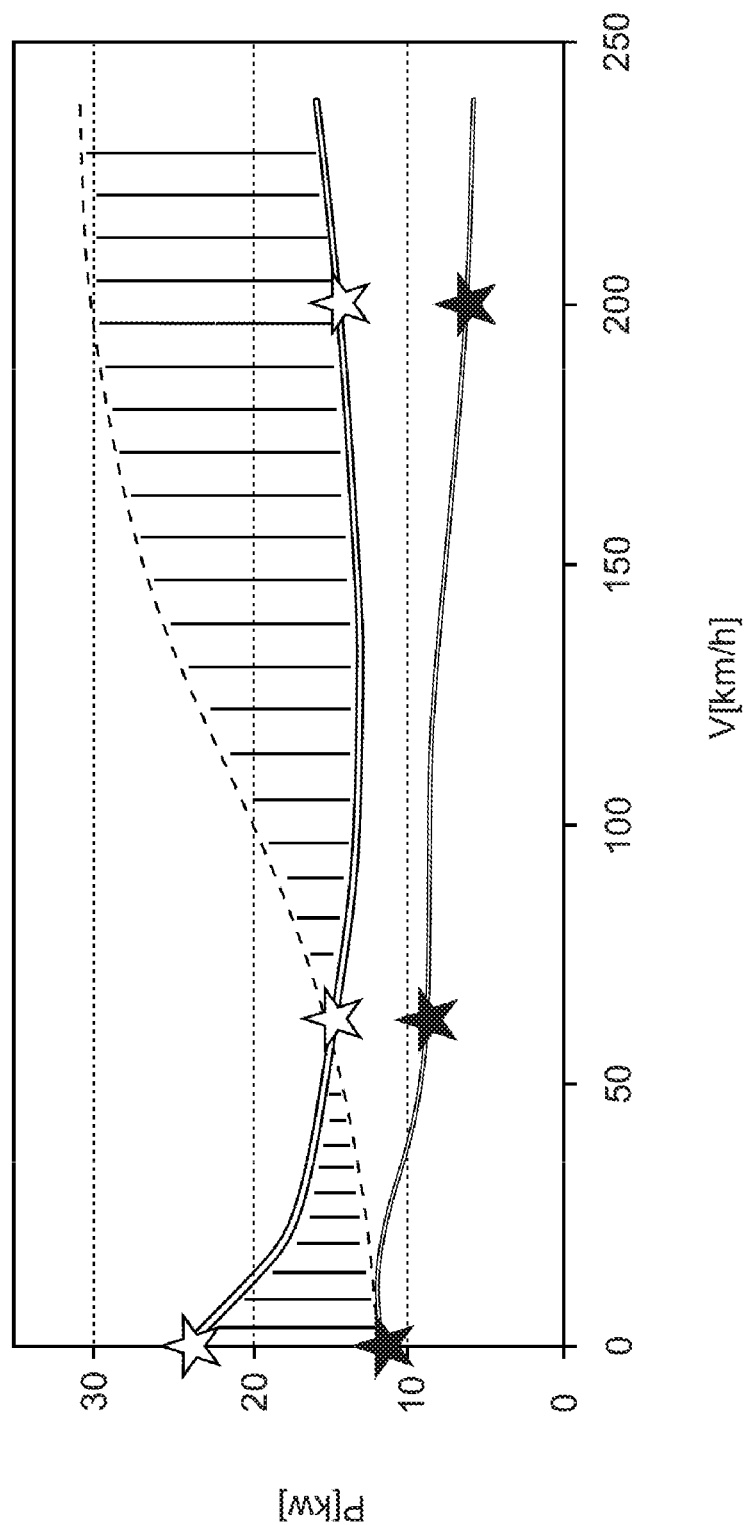
FIG. 17: shows a diagram of the output behavior of an air conditioning and battery cooling arrangement.

FIG. 17 shows a diagram of the output behavior of air conditioning and battery cooling arrangements of conventional vehicles without fast charging and of modern electric vehicles with fast charging.

The x-axis shows the vehicle speed v in km/h and the y-axis shows the output of the air conditioning and battery cooling arrangement 1 in kW. The diagram shows the heating or cooling demand of a modern electric vehicle with the fast charging feature, marked by the asterisk with an outlined perimeter. During fast charging when the vehicle is stationary, a cooling capacity of about 23 kW is required, which cannot be supplied by conventional air conditioning and battery cooling arrangements.

The condenser output is shown as a dashed curve which rises from stationary at about 12 kW to driving operation at over 30 kW. At about 60 km/h and an output of about 15 kW, the demand and output curves intersect, such that there is an output deficit up to a speed of about 60 km/h. This deficit is overcome by an air conditioning and battery cooling arrangement according to the present invention.

In comparison, a conventional vehicle without a battery electric drive and with the typical condenser output for pure air conditioning operation has no significant problems with conventional air conditioning systems.

LIST OF REFERENCE NUMERALS

1 Air conditioning and battery cooling arrangement
2 Compressor
3 Condenser
4 Expansion device
5 Ambient heat exchanger OHX
6 Stop valve
7 Expansion device
8 Expansion device
9 Expansion device
10 Front evaporator
11 Rear evaporator
12 Chiller
13 Low-pressure accumulator
14 Stop valve
15 Non-return valve
16 Non-return valve
17 Coolant pump
18 3-way valve
19 Heating heat exchanger
20 A/C coolant radiator
21 4/2-way coolant valve
22 Coolant pump
23 Heating device
24 3-way valve
25 Battery cooler
26 Stop valve
27 3-way valve
28 Coolant pump
29 Inverter
30 Converter
31 Electric motor heat exchanger
32 Drive train coolant radiator
33 Ambient air
34 3-way valve
35 Internal heat exchanger
36 Vehicle front

What is claimed is:

1. An air conditioning and battery cooling arrangement having an A/C coolant circuit and an electric drive train coolant circuit as well as a refrigeration circuit, wherein:
   the A/C coolant circuit and the electric drive train coolant circuit are coupled with each other via a 4/2-way coolant valve in such a manner that the A/C coolant circuit and the electric drive train coolant circuit are configured to be operated separately or for serial through-flow, and
   the A/C coolant circuit comprises at least an A/C coolant radiator for releasing heat into ambient air, a coolant pump, and a condenser via which the A/C coolant circuit is thermally connected to the refrigeration circuit, and
   the electric drive train coolant circuit comprises at least a battery cooler, a coolant pump, a drive train coolant radiator for releasing heat into the ambient air, and a chiller via which the electric drive train coolant circuit is thermally connected to the refrigeration circuit, and
   the refrigeration circuit comprises at least a compressor, the condenser, an ambient heat exchanger for releasing heat into the ambient air or for absorbing heat from the ambient air, an expansion device, and the chiller.

2. The air conditioning and battery cooling arrangement according to claim 1, wherein the A/C coolant circuit comprises a heating heat exchanger for heating a passenger compartment, which can be connected in parallel or alternatively can be connected to the A/C coolant radiator in the A/C coolant circuit.

3. The air conditioning and battery cooling arrangement according to claim 1, wherein the electric drive train coolant circuit has a heating device which is connected in series upstream of the battery cooler, and that furthermore a bypass to the battery cooler is formed.

4. The air conditioning and battery cooling arrangement according to claim 1, wherein a coolant pump and/or an inverter and/or an electric motor heat exchanger are configured for through-flow parallel to the battery cooler in the electric drive train coolant circuit.

5. The air conditioning and battery cooling arrangement according to claim 1, wherein an expansion device is arranged in the refrigeration circuit downstream of the condenser and upstream of the ambient heat exchanger.

6. The air conditioning and battery cooling arrangement according to claim 1, wherein a front evaporator with an associated upstream expansion device and/or a rear evaporator with an associated upstream expansion device are connected in parallel in the refrigeration circuit and/or a low-pressure accumulator is arranged upstream of the compressor in the refrigeration circuit.

7. The air conditioning and battery cooling arrangement according to claim 1, wherein an internal heat exchanger is arranged on a high pressure side downstream of the ambient heat exchanger in the refrigeration circuit.

8. The air conditioning and battery cooling arrangement according to claim 1, wherein an internal heat exchanger is arranged on a high pressure side downstream of the condenser in the refrigeration circuit.

9. A method for operating the air conditioning and battery cooling arrangement according to claim 1, wherein, if there is a high cooling capacity demand for fast battery charging, the chiller in the refrigeration circuit is operated and condensation heat from the refrigeration circuit is released into the ambient air via the ambient heat exchanger and is transferred via the condenser to a coolant circuit and released into the ambient air via the A/C coolant radiator serially connected and the drive train coolant radiator, wherein the A/C coolant circuit and the electric drive train coolant circuit are connected in series via the 4/2-way coolant valve, and wherein the battery cooler and the chiller of the refrigeration circuit form a separate coolant circuit.

10. The method according to claim 9, wherein a front evaporator and/or a rear evaporator are operated in addition to the chiller in the refrigeration circuit for producing cold air for air conditioning a passenger compartment of a vehicle.

11. A method for operating the air conditioning and battery cooling arrangement according to claim 1, wherein, if there is a moderate cooling capacity demand for air conditioning a passenger compartment of a vehicle and for battery cooling, the chiller and a front evaporator and/or a rear evaporator in the refrigeration circuit are operated and condensation heat from the refrigeration circuit is released into the ambient air via the ambient heat exchanger and is transferred via the condenser to the A/C coolant circuit and released into the ambient air via the A/C coolant radiator, wherein the drive train coolant radiator releases waste heat from the electric drive train coolant circuit into the ambient air, and wherein the battery cooler and the chiller of the refrigeration circuit form a separate coolant circuit.

12. A method for operating the air conditioning and battery cooling arrangement according to claim 1, wherein, if there is a moderate cooling capacity demand for air conditioning a passenger compartment of a vehicle, a front evaporator and/or a rear evaporator in the refrigeration circuit are operated and condensation heat from the refrigeration circuit is released into the ambient air via the ambient heat exchanger and is transferred via the condenser to the A/C coolant circuit and released into the ambient air via the A/C coolant radiator, and wherein the drive train coolant radiator releases waste heat from the electric drive train coolant circuit into the ambient air.

13. A method for operating the air conditioning and battery cooling arrangement according to claim 1, wherein, if there is a moderate cooling capacity demand for active battery cooling, the chiller in the refrigeration circuit is operated and condensation heat from the refrigeration circuit is released into the ambient air via the ambient heat exchanger and is transferred via the condenser to the A/C coolant circuit and released into the ambient air via the A/C coolant radiator, wherein the drive train coolant radiator releases waste heat from the electric drive train coolant circuit into the ambient air, and wherein the battery cooler and the chiller of the refrigeration circuit form a separate coolant circuit.

14. A method for operating the air conditioning and battery cooling arrangement according to claim 1, wherein, during passive battery cooling, the drive train coolant radiator releases waste heat from the electric drive train coolant circuit into the ambient air, and wherein the battery cooler is connected in parallel to an electric motor heat exchanger and/or to a converter and/or to an inverter.

15. A method for operating the air conditioning and battery cooling arrangement according to claim 1, wherein, in reheat operation at mild ambient temperatures, a front evaporator and/or a rear evaporator in the refrigeration circuit are operated and condensation heat from the refrigeration circuit is released into the ambient air via the ambient heat exchanger as well as transferred via the condenser to the A/C coolant circuit and released via a heating heat exchanger for reheating air for a passenger compartment, wherein the drive train coolant radiator releases the waste heat from the electric drive train coolant circuit into the ambient air, and wherein the battery cooler is connected in parallel to an electric motor heat exchanger and/or to a converter and/or to an inverter.

16. A method for operating the air conditioning and battery cooling arrangement according to claim 1, wherein, in reheat operation at cold ambient temperatures, the chiller, a front evaporator and/or a rear evaporator in the refrigeration circuit are operated and condensation heat from the refrigeration circuit is transferred via the condenser to the A/C coolant circuit and a heating heat exchanger for heating air for a passenger compartment, and wherein the battery cooler is connected in parallel to an electric motor heat exchanger and/or to a converter and/or to an inverter, wherein the chiller of the refrigeration circuit forms a separate coolant circuit with the battery cooler and the electric drive train coolant circuit connected in parallel.

17. A method for operating the air conditioning and battery cooling arrangement according to claim 1, wherein, in heating operation at cold ambient temperatures, the ambient heat exchanger in the refrigeration circuit is connected as an evaporator for absorbing heat from the ambient air, and wherein condensation heat from the refrigeration circuit is transferred via the condenser to the A/C coolant circuit and a heating heat exchanger for heating air for a passenger compartment.

18. A method for operating the air conditioning and battery cooling arrangement according to claim 1, wherein, in heating operation at cold ambient temperatures, the chiller in the refrigeration circuit is operated and condensation heat from the refrigeration circuit is transferred via the condenser to the A/C coolant circuit and a heating heat exchanger for heating air for a passenger compartment, and wherein the chiller of the refrigeration circuit forms a separate coolant circuit with an electric motor heat exchanger and/or a converter and/or an inverter of the electric drive train coolant circuit.

19. The method for operating an air conditioning and battery cooling arrangement according to claim 18, wherein the ambient heat exchanger is operated as an evaporator in addition to the chiller in the refrigeration circuit.

20. A method for operating the air conditioning and battery cooling arrangement according to claim 1, wherein, in heating operation at very cold ambient temperatures, the chiller in the refrigeration circuit is operated and condensation heat is transferred from the refrigeration circuit via the condenser to the A/C coolant circuit and to a heating heat exchanger for heating air for a passenger compartment, and wherein the chiller of the refrigeration circuit forms a separate coolant circuit with an additional heating device of the electric drive train coolant circuit.

21. A method for operating the air conditioning and battery cooling arrangement according to claim 1, wherein, in heating operation at cold ambient temperatures, the ambient heat exchanger in the refrigeration circuit is connected as an evaporator for absorbing heat from the ambient air, and wherein condensation heat from the refrigeration circuit is transferred via the condenser to the A/C coolant circuit and a heating heat exchanger for heating air for a passenger compartment, and in that the battery cooler forms a separate coolant circuit with an additional heating device of the electric drive train coolant circuit for heating the battery cooler.

* * * * *